United States Patent
Sowder et al.

(10) Patent No.: US 12,155,221 B2
(45) Date of Patent: *Nov. 26, 2024

(54) MANAGING THE OUTFLOW OF A SOLAR INVERTER

(71) Applicant: DOOSAN GRIDTECH, INC., Seattle, WA (US)

(72) Inventors: Dan Sowder, Seattle, WA (US); David Schroeder, Port Townsend, WA (US)

(73) Assignee: Doosan GridTech, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/161,640

(22) Filed: Jan. 30, 2023

(65) Prior Publication Data
US 2023/0253800 A1 Aug. 10, 2023

Related U.S. Application Data

(63) Continuation of application No. 16/549,974, filed on Aug. 23, 2019, now Pat. No. 11,569,665, which is a
(Continued)

(51) Int. Cl.
*H02J 3/38* (2006.01)
*H02J 3/46* (2006.01)
(Continued)

(52) U.S. Cl.
CPC ............ *H02J 3/48* (2013.01); *H02J 3/381* (2013.01); *H02J 3/46* (2013.01); *H02S 10/00* (2013.01);
(Continued)

(58) Field of Classification Search
CPC ...... H02J 3/48; H02J 3/383; H02J 3/46; H02J 13/0006; H02S 10/00; Y02E 40/70; Y02E 10/56
See application file for complete search history.

(56) References Cited

U.S. PATENT DOCUMENTS 8,119,298 B2 * 2/2012 Aso .................. H01M 8/04686
429/432
8,914,158 B2 12/2014 Geinzer
(Continued)

FOREIGN PATENT DOCUMENTS

JP         5477038 B2   4/2014
JP     2015-138912 A   7/2015
(Continued)

OTHER PUBLICATIONS

Fuji et al, "Fault ride through capability for solar inverters" pp. 1-9, 2011, downloaded from https://ieeexplore.ieee.org/abstract/document/6020556 (Year: 2011).*

*Primary Examiner* — Robert E Fennema
*Assistant Examiner* — Olvin Lopez Alvarez
(74) *Attorney, Agent, or Firm* — Shook, Hardy & Bacon L.L.P.

(57) ABSTRACT

A facility receives an indication of a rate of energy output sought from a production array of solar panels. The facility controls a power inverter to which the production array is connected to deliver to an electrical grid to which the power inverter is connected a rate of energy output that is based on the indicated rate of energy output.

20 Claims, 26 Drawing Sheets

Related U.S. Application Data continuation of application No. 14/949,642, filed on Nov. 23, 2015, now Pat. No. 10,439,401.

(51) Int. Cl.
  *H02J 3/48* (2006.01)
  *H02S 10/00* (2014.01)
(52) U.S. Cl.
  CPC ........... *H02J 2300/24* (2020.01); *Y02E 10/56* (2013.01); *Y02E 40/70* (2013.01)

(56) References Cited

U.S. PATENT DOCUMENTS

| | | |
|---|---|---|
| 10,554,170 B2 | 2/2020 | Drees |
| 2009/0040029 A1 | 2/2009 | Bridges et al. |
| 2009/0295162 A1 | 12/2009 | Oohara et al. |
| 2010/0198420 A1 | 8/2010 | Rettger et al. |
| 2011/0001356 A1 | 1/2011 | Pollack |
| 2011/0019447 A1 | 1/2011 | Olsen |
| 2011/0227417 A1 | 9/2011 | Walker |
| 2013/0018516 A1 | 1/2013 | Chee et al. |
| 2013/0054037 A1 | 2/2013 | Ikawa et al. |
| 2013/0054044 A1 | 2/2013 | Shaffer et al. |
| 2013/0073099 A1 | 3/2013 | Bronicki |
| 2013/0131884 A1 | 5/2013 | Jain et al. |
| 2013/0231797 A1 | 9/2013 | Li et al. |
| 2013/0305528 A1 | 11/2013 | Anderson |
| 2013/0321040 A1 | 12/2013 | Johal et al. |
| 2013/0328406 A1 | 12/2013 | Matsuura et al. |
| 2014/0074311 A1 | 3/2014 | Kearns et al. |
| 2014/0095076 A1 | 4/2014 | Marwah et al. |
| 2014/0214230 A1 | 7/2014 | Gurudasani et al. |
| 2014/0288725 A1 | 9/2014 | Itaya |
| 2015/0006080 A1 | 1/2015 | Yamazaki et al. |
| 2015/0019034 A1 | 1/2015 | Gonatas |
| 2015/0234943 A1 | 8/2015 | Brier et al. |
| 2016/0043557 A1 | 2/2016 | Nishimori |
| 2016/0118803 A1 | 4/2016 | Takahashi et al. |
| 2016/0276834 A1 | 9/2016 | McCullough et al. |
| 2017/0018930 A1 | 1/2017 | Kawano et al. |
| 2017/0240162 A1* | 8/2017 | Higashitani ............... B60K 6/48 |

FOREIGN PATENT DOCUMENTS

| | | |
|---|---|---|
| KR | 10-1020813 B1 | 3/2011 |
| TW | 201539973 A | 10/2015 |
| WO | 2011/092882 A1 | 8/2011 |

* cited by examiner

Calculation of Moving Average Delta

Question
How likely is it that the sun will be blocked in the next moment?

Answer
Moment to moment, calculate this Moving Average Delta:

*(How much solar blockage has there been on average over a longer time?)*
*and then subtract:*
*(How much solar blockage has there been on average over a shorter time?)*

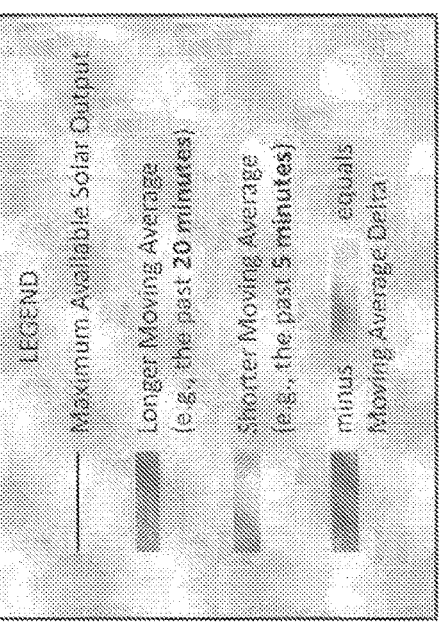

Examples: Moving Average Delta

1010

*"Has been sunnier, getting cloudier"*
yields a small positive number.
500 – 475 = 25

1020

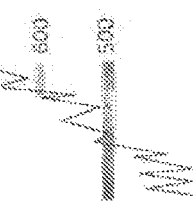

*"Has been sunnier, getting much cloudier"*
yields a large positive number.
500 – 400 = 100

1030

*"Has been cloudier, getting sunnier"*
yields a small negative number.
500 – 525 = –25

1040

*"Has been cloudier, getting much sunnier"*
yields a large negative number.
500 – 600 = –100

*Figure 10*

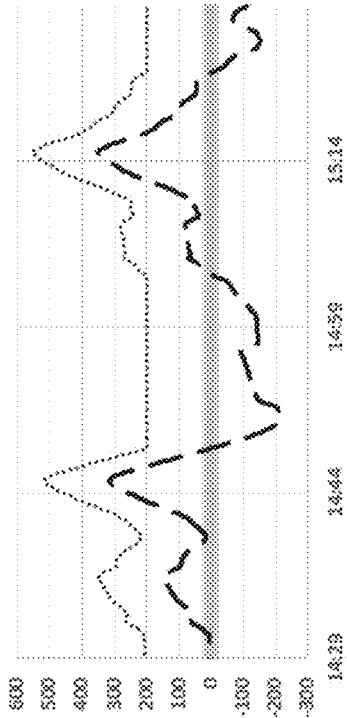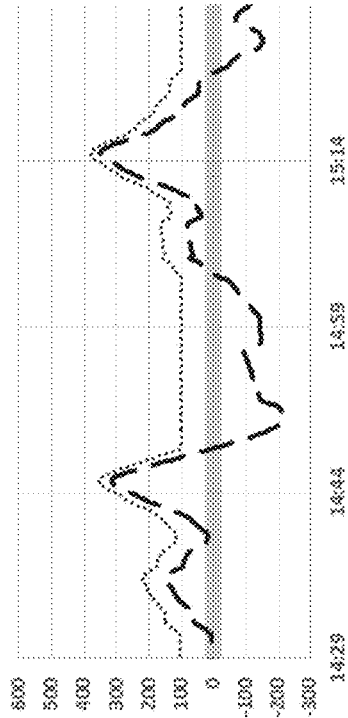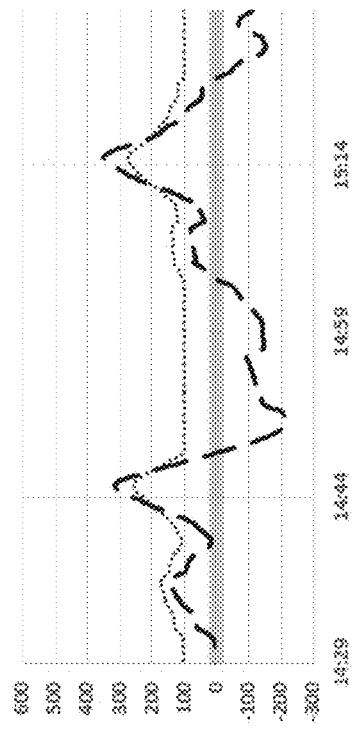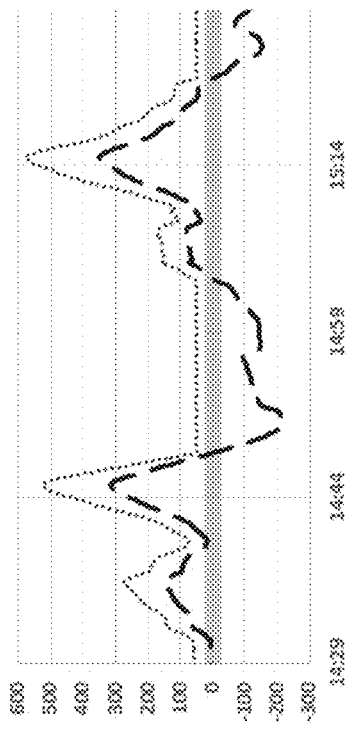
Figure 12

MANAGING THE OUTFLOW OF A SOLAR INVERTER

CROSS-REFERENCE TO RELATED APPLICATIONS

This application is a continuation of U.S. patent application Ser. No. 16/549,974, filed on Aug. 23, 2019, which is a continuation of U.S. patent application Ser. No. 14/949,642, filed on Nov. 23, 2015, now U.S. Pat. No. 10,439,401, issued Oct. 8, 2019 and entitled "MANAGING THE OUTFLOW OF A SOLAR INVERTED," the disclosures of which are incorporated by reference herein in their entirety.

BACKGROUND

Electric utilities need reliable sources of energy. Because generation must match electrical load, which varies throughout the day, they want generation resources that can be turned on or off, or up or down anytime, like a water faucet. They call such sources of energy dispatchable.

They consider a hydro-electric plant to be dispatchable because the river is always flowing. They consider a natural gas 'peaker' plant to be dispatchable because it can be fired up at any time.

The conventional view of photovoltaic (PV) solar arrays is that they are not dispatchable, because the sun is not always shining on them. Solar is an intermittent energy source, which is not what utility operators want when they need more energy immediately.

BRIEF DESCRIPTION OF THE DRAWINGS

FIG. 10 illustrates calculation of the Moving Average Delta, which quantifies the probability of solar blockage based on recent and current solar data.

FIG. 12 illustrates how the size of an Upper Buffer responds to various settings of Minimum Size and Sensitivity Ratio over a portion of a sample solar day.

DETAILED DESCRIPTION

Figure 1:
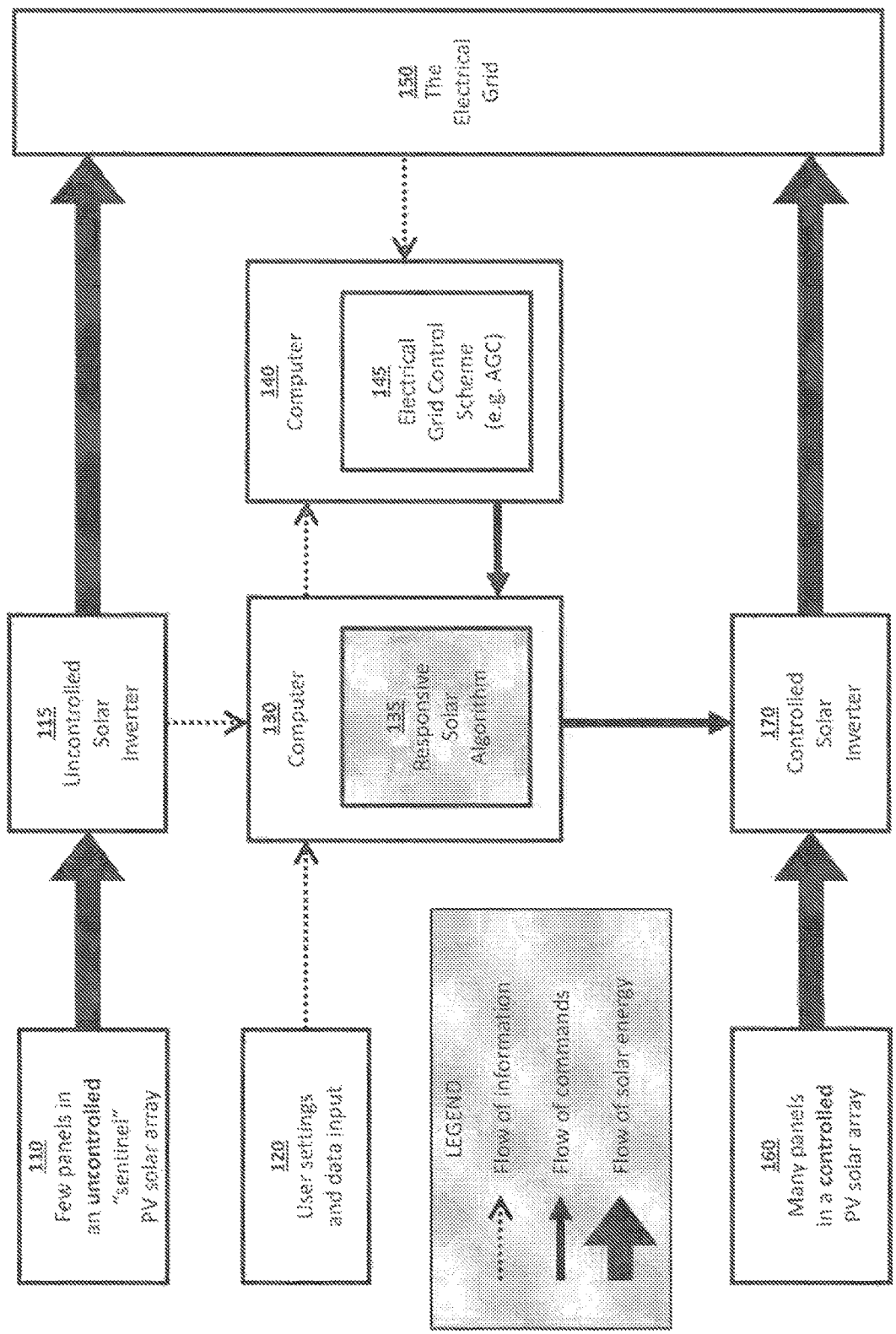
FIG. 1 is a high-level diagram of the components used by the facility.

The benefits of utilizing solar power include lower fuel costs, lower carbon emissions, and other benefits associated with more distributed, less centralized sources of generation. While many utilities acknowledge these benefits, the inventors have recognized that the intermittent quality of solar generation limits their ability to maximize these benefits.

The inventors have noted that utilities often proceed from a sense of obligation to use every Watt of solar output that is available, not wanting to leave any solar energy unused. The inventors have recognized that this approach tends to exacerbate the very characteristic of solar that utilities find most troubling—its volatility. The inventors have recognized that by carefully discarding some of the solar energy that is available, the solar energy that remains can much more reliably be used—and cost-effectively provide greater overall benefit to the power system.

Moreover, dispatchability, as a characteristic of energy resources, is not binary. All resources vary in how reliably they are available, or can be controlled—and even those traditionally considered to be dispatchable are not absolutely so. All resources have limits, and equipment can break down at any time. Resources like hydro and natural gas are considered dispatchable—not because they are without limit or can never break down—but because, over time, their limitations have become understood, accepted, and managed.

In view of the foregoing, the inventors have conceived and reduced to practice a software and hardware facility for understanding, accepting, and managing the limitations of a PV solar array ("the facility"). The facility enables solar to be considered a significantly more dispatchable source of energy by utilities than it currently is, making solar energy workably dispatchable.

By realistically determining the available capacity of solar output, the facility makes that capacity more useful and reliable to the electrical grid and its operators. The more the natural limitations of solar output are understood, accepted, and managed, the more confidently the portion of solar output that can be utilized will be utilized.

In some embodiments, the facility uses "sentinel" PV panels placed amid or adjacent to the bulk of the solar array as a basis for assessing the maximum available output of the entire array from moment to moment.

In some embodiments, the facility calculates a usable range of solar output that is below the maximum available output.

In some embodiments, in factoring into these calculations the interruption of sunlight falling on the panels of an array by clouds or other intervening objects ("solar blockage"), the facility does not attempt to predict whether or not blockage will occur. Rather, it calculates a probability of blockage based on recent and current solar data.

In some embodiments, the facility employs user-settable parameters informed by such factors as local climatological and seasonal patterns, the relative efficiency of local PV equipment, and the desire to decrease the volatility of solar energy output.

In some embodiments, the facility enables a PV solar array to be paired with any electrical grid control scheme that issues commands for greater or lesser active power to regulate other system parameters.

Such grid control schemes typically include:

First, Automatic Generation Control (AGC), a system used to control frequency within a Grid Balancing Authority. Fluctuations in AC frequency on the grid can indicate whether present power supplies are meeting present power demands. An AGC system typically responds to such fluctuations by sending commands to dispatchable sources of energy to increase or decrease their real energy output.

Second, any other source of a Frequency Response signal that responds to fluctuations in grid frequency by sending commands to dispatchable sources of energy to increase or decrease their real energy output.

Third, a control scheme (such as Volt/Watt) that responds to fluctuations in grid voltage by sending commands to dispatchable sources of energy to increase or decrease their real energy output.

Fourth, a control scheme (such as Power Smoothing) that responds to fluctuations in system load or generation by sending commands to dispatchable sources of energy to increase or decrease their real energy output.

Fifth and finally, in some embodiments, the facility determines locally how to vary the output of the PV array within the output range determined by the facility, such as by observing the frequency of the grid at the array and applying a "droop curve"—a function relating frequency to power.

The facility makes it practical for a PV solar array to be among the sources of energy called upon by any of the above grid control schemes.

By operating in some or all of the ways discussed above, the facility transforms solar energy from a source of volatility into a solution to volatility—whether that volatility is in frequency, voltage, or real power—and whether that volatility comes from some other source, or from the PV array itself.

The inventors believe that in many situations this facility is a more cost effective way to manage grid volatility than many of the resources used today to do so, such as traditional ancillary services. Although this facility may result in a reduction of the overall energy utilized from an individual solar array, it can result in overall economic benefit to the grid by displacing a more expensive means of managing grid volatility.

FIG. 1 is a high-level diagram of the components used by the facility in some embodiments. A small array of solar photovoltaic (PV) panels 110 is located among or adjacent to a larger array of solar PV panels 160. Each of these two arrays sends solar power through its own inverter to the electrical grid 150.

The small "sentinel" PV array 110 sends its energy to a solar inverter 115, whose output is not controlled by any grid control scheme or algorithm. The larger PV array 160 sends its power to a separate inverter 170, whose output is controlled by the responsive solar algorithm 135 that is at the heart of the facility.

The responsive solar algorithm 135 is a software program run on a computer 130. The algorithm gets information from the uncontrolled solar inverter 115, and sends commands to the controlled solar inverter 170. The algorithm can also send information to and receive commands from an external computer 140 running an electrical grid control scheme 145 such as AGC or any of several other grid control schemes that need to control real power from the PV array to condition other grid characteristics, such as voltage or frequency.

The external electrical grid control scheme 145, in turn, can get information from the electrical grid 150 about the grid characteristics that it is assigned to condition.

In some embodiments, the electrical grid control scheme 145 gets all the information it needs to issue commands to the responsive solar algorithm 135 by reading changes in the electrical grid 150.

In some embodiments, as a more specific basis for the electrical grid control scheme 145 generating its commands, 145 receives indications of the present usable range of output of the PV array directly from the responsive solar algorithm 135. In this embodiment, the responsive solar algorithm 135 generates information and data for the electrical grid control scheme 145 from information received from solar inverter 115 and from other sources.

In some embodiments, there are user-definable settings and other inputs such as weather forecasts, load volatility or other relevant data 120, which affect the amount of PV output that is allowed, and in some embodiments those settings are calculated from weather forecasts and other inputs that will increase or decrease buffer size and sensitivity based on those forecasts.

The flow of solar energy in FIG. 1 is as follows: First, from the smaller PV array 110 (as DC) to its solar inverter 115 to the grid 150 (as AC). Second, from the larger PV array 160 (as DC) to its solar inverter 170 to the grid 150 (as AC). This flow of solar energy from the larger PV array is controlled by the responsive solar algorithm 135.

The flow of information in FIG. 1 is as follows: First, the responsive solar algorithm 135 receives the output of the "sentinel" solar array from the uncontrolled solar inverter 115. Second, the external electrical grid control scheme 145 reads parameters such as load, voltage and frequency from the electrical grid 150. In some embodiments, the electrical grid control scheme 145 also gets information on the usable range of solar output from the responsive solar algorithm 135. In some embodiments, the responsive solar algorithm 135 gets information from user settings and other data such as weather forecasts 120.

The flow of commands, feedback loop, and resulting operation of the larger PV array in FIG. 1 is as follows: The electrical grid control scheme 145 sends commands to the responsive solar algorithm 135, which, as a result, sends commands to the controlled solar inverter 170, which, as a result, sends more or less solar power to the electrical grid 150, which causes changes to the electrical grid, after which information about the changes (caused either by the solar output or because of other factors influencing the grid) is passed to the electrical grid control scheme 145, which then determines what further commands are needed.

Figure 2:
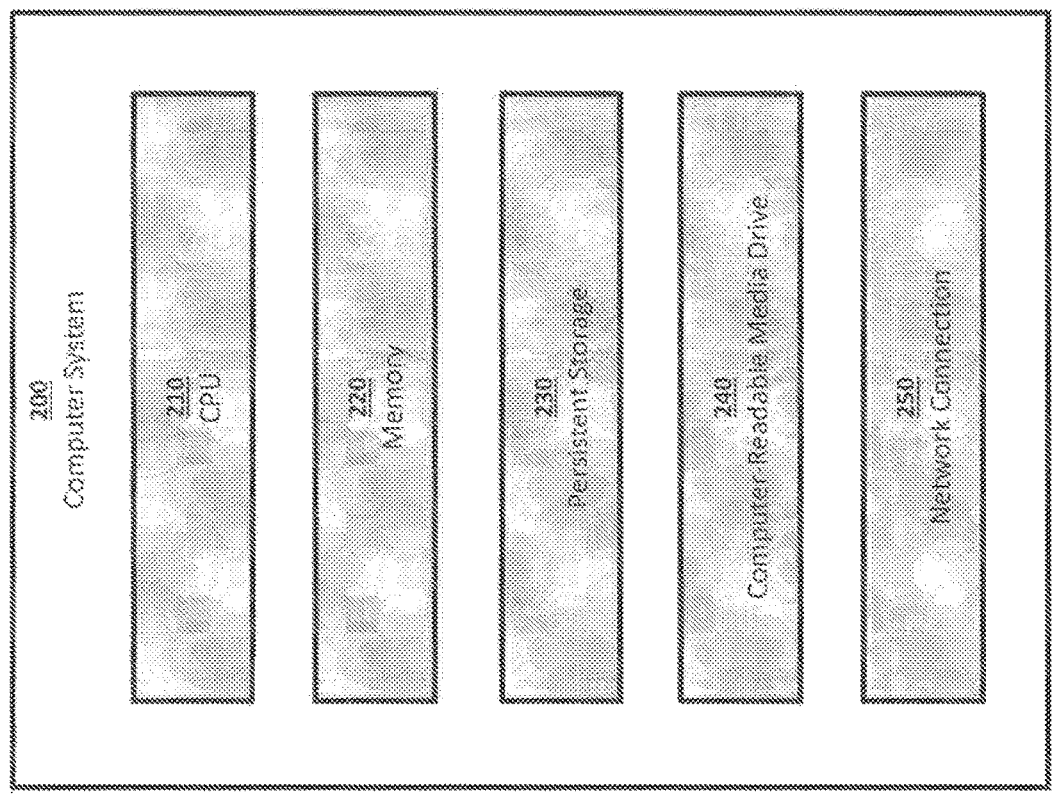
FIG. 2 is a block diagram showing some of the components that may be incorporated in at least some of the computer systems and other devices on which the facility operates.

FIG. 2 is a block diagram showing some of the components that may be incorporated in at least some of the computer systems and other devices on which the facility operates. Those experienced in the field will recognize that these computer systems and other devices 200 can include server computer systems, desktop computer systems, laptop computer systems, tablet computer systems, netbooks, or other computing devices. In various examples, the computer systems and devices may include any number of the following: a central processing unit ("CPU") 210 for executing computer programs; a computer memory 220 for storing programs and data while they are being used, including the facility and associated data, an operating system including a kernel and device drivers, and one or more applications; a persistent storage device 230, such as a hard drive or flash drive for persistently storing programs and data; a computer-readable media drive 240, such as a floppy, CD-ROM, or DVD drive, for reading programs and data stored on a computer-readable medium; and/or a communications subsystem 250 for connecting the computer system to other computer systems and/or other devices to send and/or receive data, such as via the Internet or another wired or wireless network and its networking hardware, such as switches, routers, repeaters, electrical cables and optical fibers, light emitters and receivers, radio transmitters and receivers, and the like.

Figure 3:
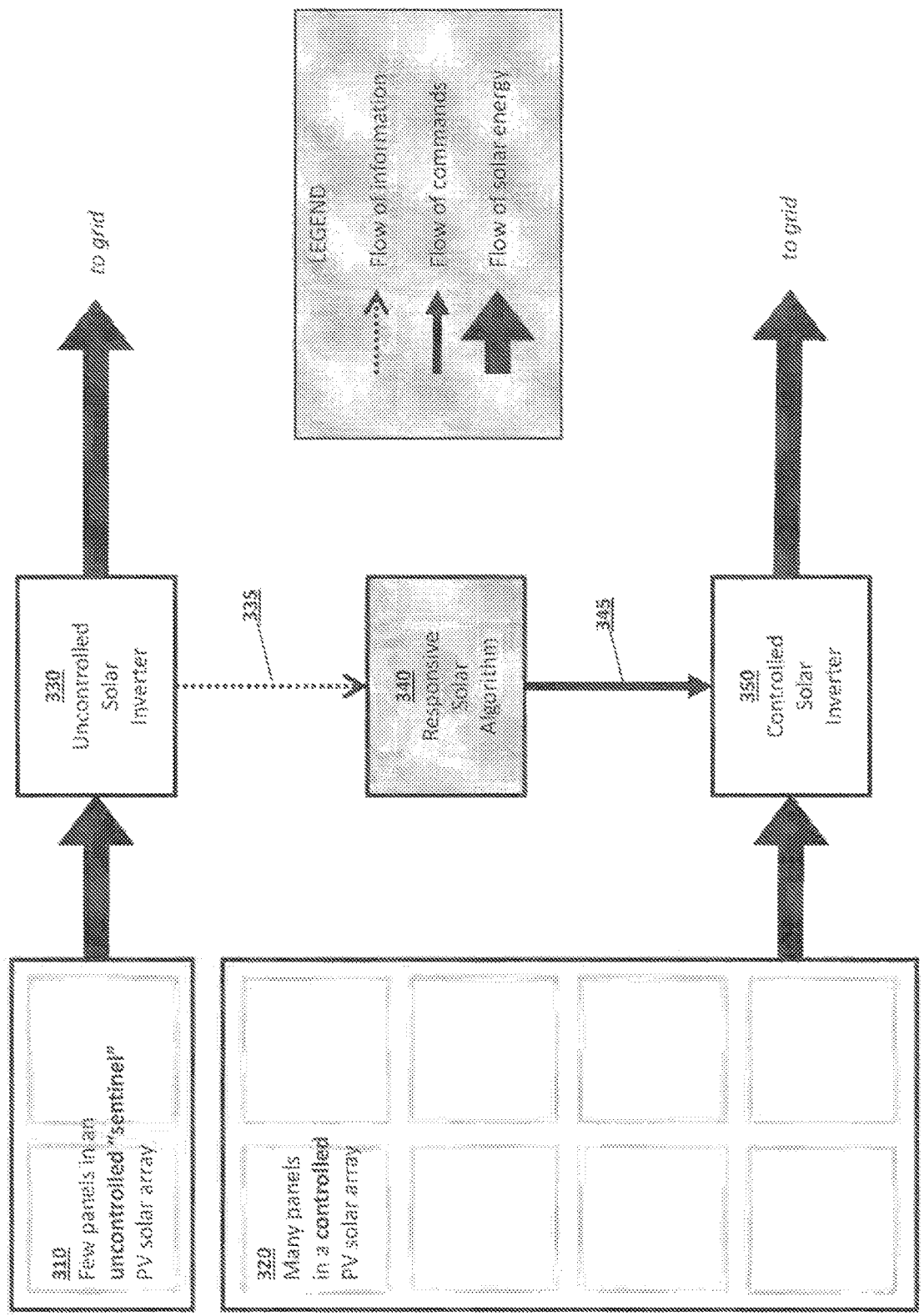
FIG. 3 is a high-level diagram of the two PV arrays, illustrating the relationships between the small uncontrolled "sentinel" array/inverter and the large controlled array/inverter.

FIG. 3 is a high-level diagram of the two PV arrays, illustrating the relationships among the small uncontrolled "sentinel" array 310 and its inverter 330, the large controlled array 320 and its inverter 350, and the responsive solar algorithm 340.

To maximize the efficient use of solar power, the responsive solar algorithm 340 first answers the question: "Moment to moment, how much solar power is the large controlled array 320 capable of providing?" In order to answer this question, the algorithm gets a report 335 of the actual output of the smaller array from the uncontrolled solar inverter 330, uses that information to calculate a Maximum Available Solar Output, and then uses that value to send appropriate commands 345 to intelligently control the output of the larger array's solar inverter 350.

The Maximum Available Solar Output is a dynamic benchmark of the energy that the larger solar array 320 could provide at every moment. Using that benchmark, the facility then defines a subset of the Maximum Available Solar Output that is most reliable to use.

The amount of solar power that the larger PV array 320 is capable of providing at a given moment—its Maximum Available Solar Output—is given by:

$$\text{actual output of the smaller array} * \frac{\text{output capacity of the larger array}}{\text{output capacity of the smaller array}}$$

For example, at a particular moment, the smaller "sentinel" array is providing 200 kilowatts of energy. The rated output capacity of the larger array is 1200 kilowatts. The rated output capacity of the smaller array is 300 kilowatts. Thus:*

$$200 \text{ kW} * \frac{1200 \text{ kW}}{300 \text{ kW}} = 800 \text{ kW}$$

The facility therefore determines the Maximum Available Solar Output of the larger PV array at this moment to be 800 kilowatts.

The smaller "sentinel" array is needed to determine the Maximum Available Solar Output of the larger array because the larger array's inverter will be busy attenuating its power output per commands from the facility. Inverters, as presently built, are not able to determine the maximum potential of its solar input at the same time it is attenuating that solar for output.

Figure 4:
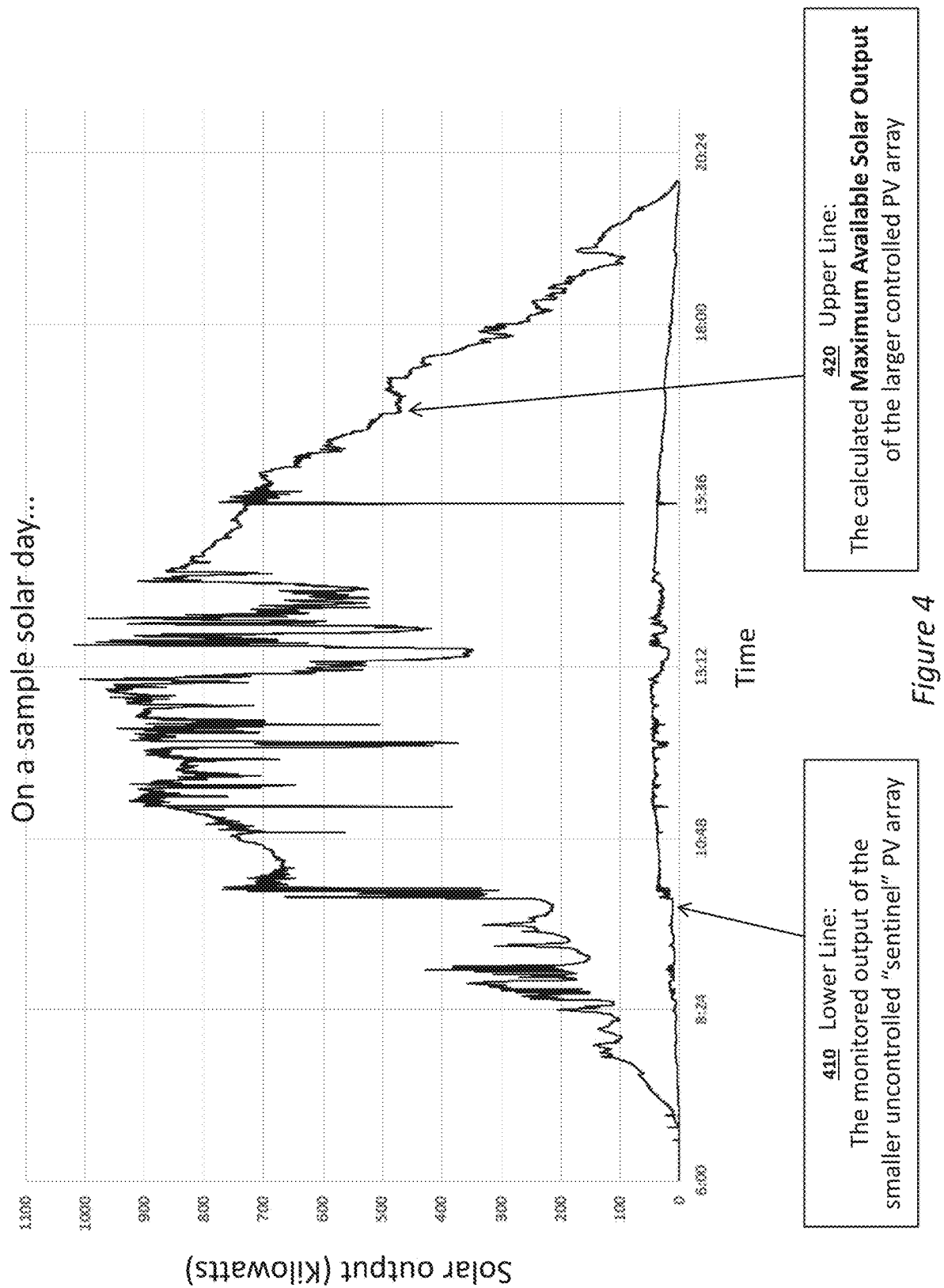
FIG. 4 charts a sample solar day, illustrating the difference between the monitored output of the "sentinel" array and the Maximum Available Solar Output of the large array.

FIG. 4 charts a sample solar day, illustrating the difference between the monitored output of the smaller "sentinel" array 410 (the lower line) and the calculated Maximum Available Solar Output of the larger array 420 (the upper line).

Figure 5:
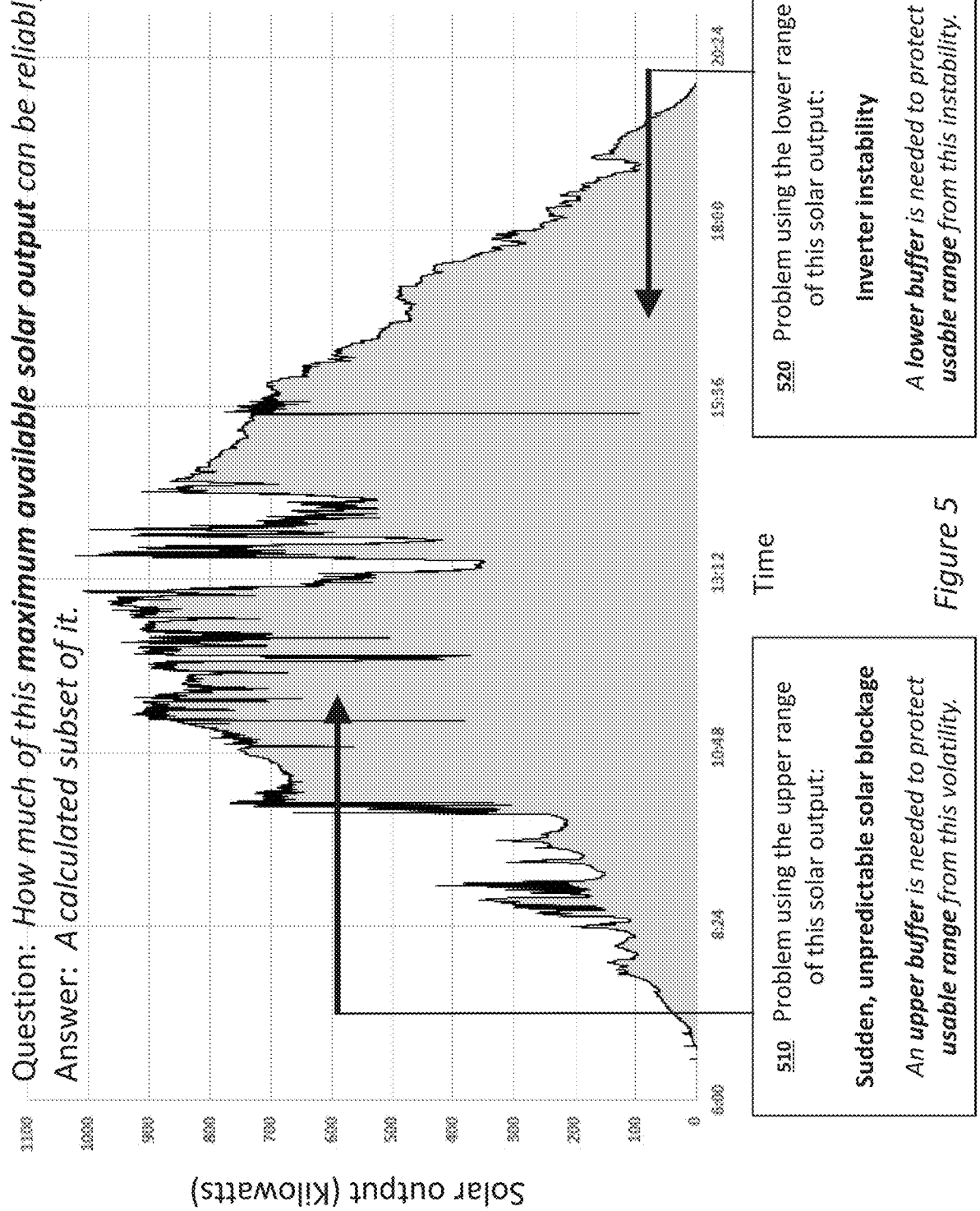
FIG. 5 illustrates significant challenges in utilizing the Maximum Available Solar Output, and the need to define an Upper Buffer and a Lower Buffer to calculate a Usable Range, which is a subset of the Maximum Available Solar Output).

FIG. 5 illustrates significant challenges that electric utilities have in attempting to use this Maximum Available Solar Output.

A first problem is described in callout 510: The upper range of the Maximum Available Solar Output is vulnerable to sudden, unpredictable solar blockage. As illustrated on the chart, the line of solar output can "cut down" and reduce the Maximum Available Solar Output at any time.

This is the reason electric utilities do not consider solar energy to be dispatchable. As utilities seek to increase solar's contribution to the power grid, the common assumption that they must at all times use a solar array's entire Maximum Available Solar Output brings them face-to-face with this problem.

A second problem is described in callout 520: It is typically difficult for solar inverters to operate within the lower range of the Maximum Available Solar Output because of the way they work. Some inverters can become instable (and liable to shutdown) when asked to attenuate large amounts of solar energy at low power output levels relative to their rated power capacity.

The facility addresses the first problem 510 by calculating an Upper Buffer to put distance between the volatility of solar blockage and a Usable Range of solar output. Defining this Upper Buffer between the Maximum Available Solar Output and the Usable Range reduces the likelihood that the next solar blockage will infringe upon that Usable Range.

No buffer can reduce that likelihood to zero. If a thick solitary cloud comes "out of nowhere" and blocks the PV array, nothing can stop the Maximum Available Solar Output from falling to zero. However, in calculating an Upper Buffer, the facility greatly increases the likelihood that the solar energy it defines as being within the Usable Range will be available.

The facility addresses the second problem 520 by calculating a Lower Buffer that ensures that the Lower Limit of Usable Range stays above the point of potential inverter instability.

By addressing these two problems, the facility enables electric utilities to define a range of available solar output within which they can control the solar array output with a reasonable degree of reliability. This enables the solar array to deliver grid-supportive functions that require such dispatchable flexibility. Thus, the facility enables new benefits from solar that are available even when it is not necessarily delivering the maximum amount of solar energy.

Figure 6A:
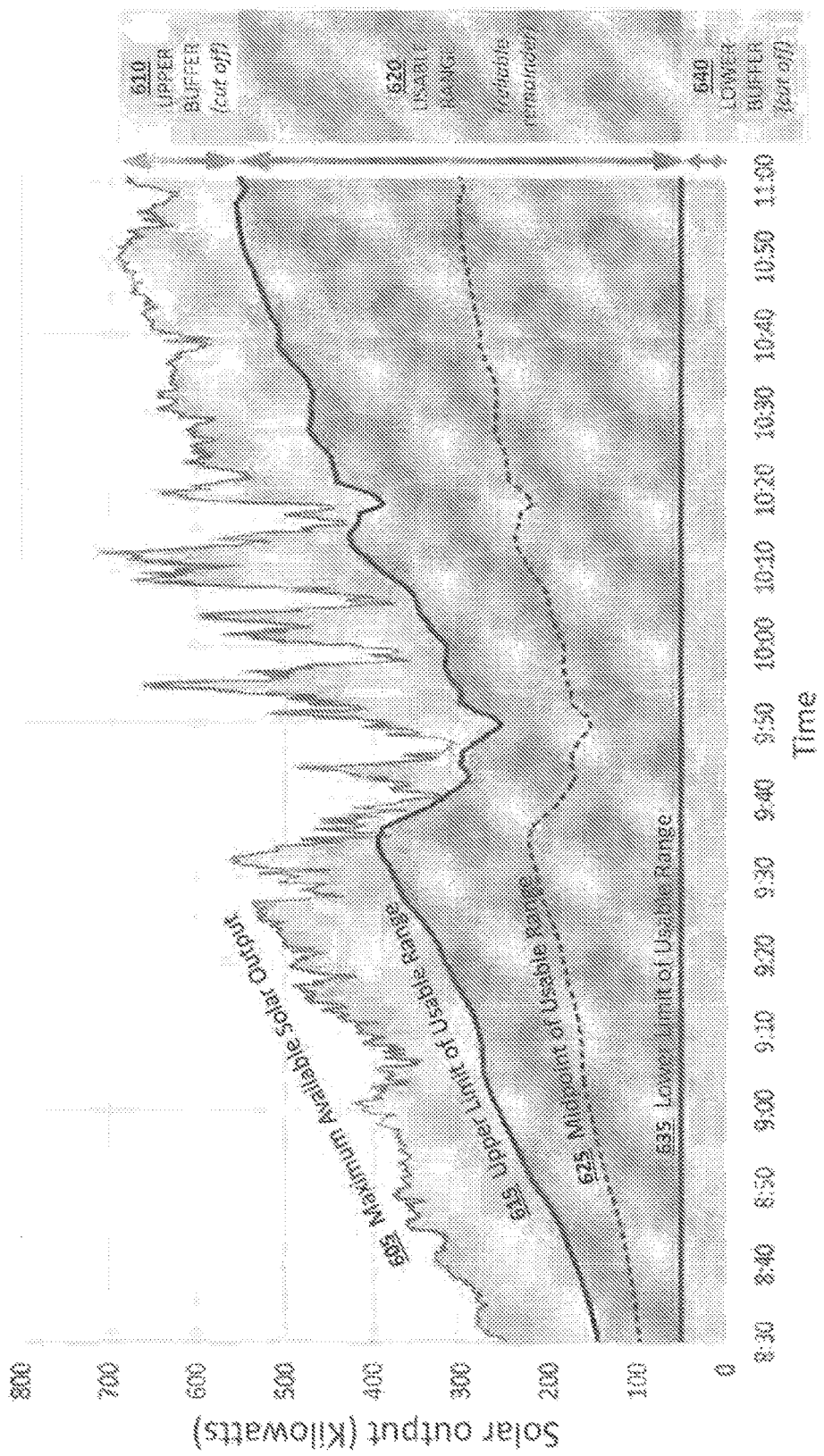
FIG. 6A illustrates the relationship between the Upper and Lower Buffers and the Usable Range of solar output over a portion of a sample day.

FIG. 6A illustrates the relationship between the Upper and Lower Buffers and the Usable Range of solar output over a portion of a sample morning.

As the sun climbs the sky, the Maximum Available Solar Output 605 gradually increases, subject to varying degrees of solar blockage (the dips in the line).

By calculating the size of an Upper Buffer 610, the facility defines the Upper Limit 615 of a Usable Range 620 of solar output.

By calculating the size of a Lower Buffer 640, the facility defines the Lower Limit 635 of that Usable Range 620.

Once Usable Range has been defined, in some embodiments the facility determines a Midpoint 625, which is useful for grid control schemes like AGC that request a delta of real power output from a baseline.

In short, the facility calculates the amount of less reliable capacity to cut off each end (610 and 640) of the Maximum Available Solar Output, leaving the remainder—the Usable Range 620—to be called upon with a degree of confidence much greater than is conventionally granted to solar energy sources.

In calculating the size of the Upper Buffer, in some embodiments the facility uses five tools: A Shorter Moving Average, a Longer Moving Average; a Moving Average Delta, a Minimum Size, and a Sensitivity Ratio.

Figure 6B:
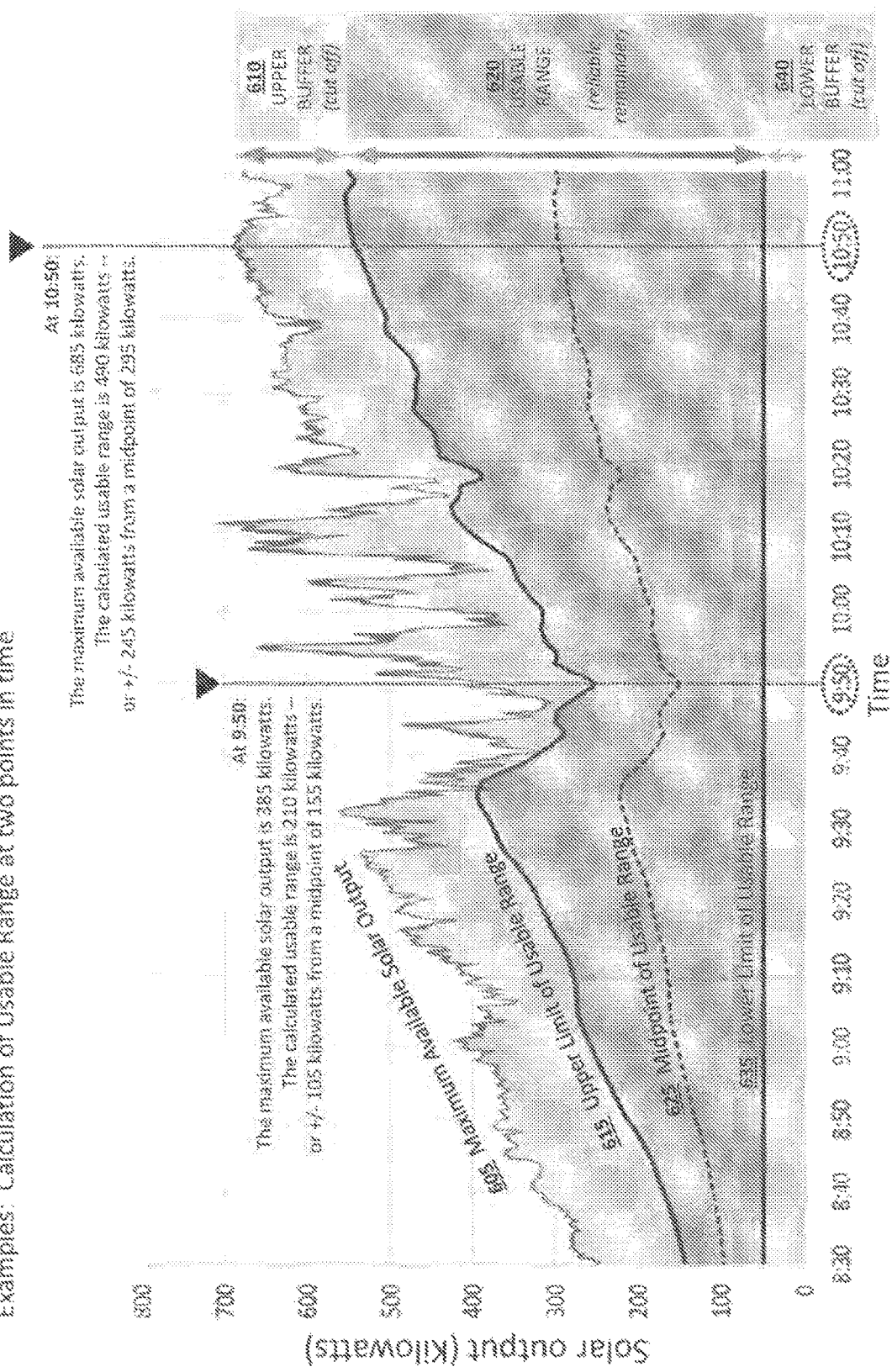
FIG. 6B illustrates examples of the Usable Range at two time points on the sample day.

FIG. 6B illustrates examples of the Usable Range at two specific time points on the same sample day shown in FIG. 6A.

Figure 7:
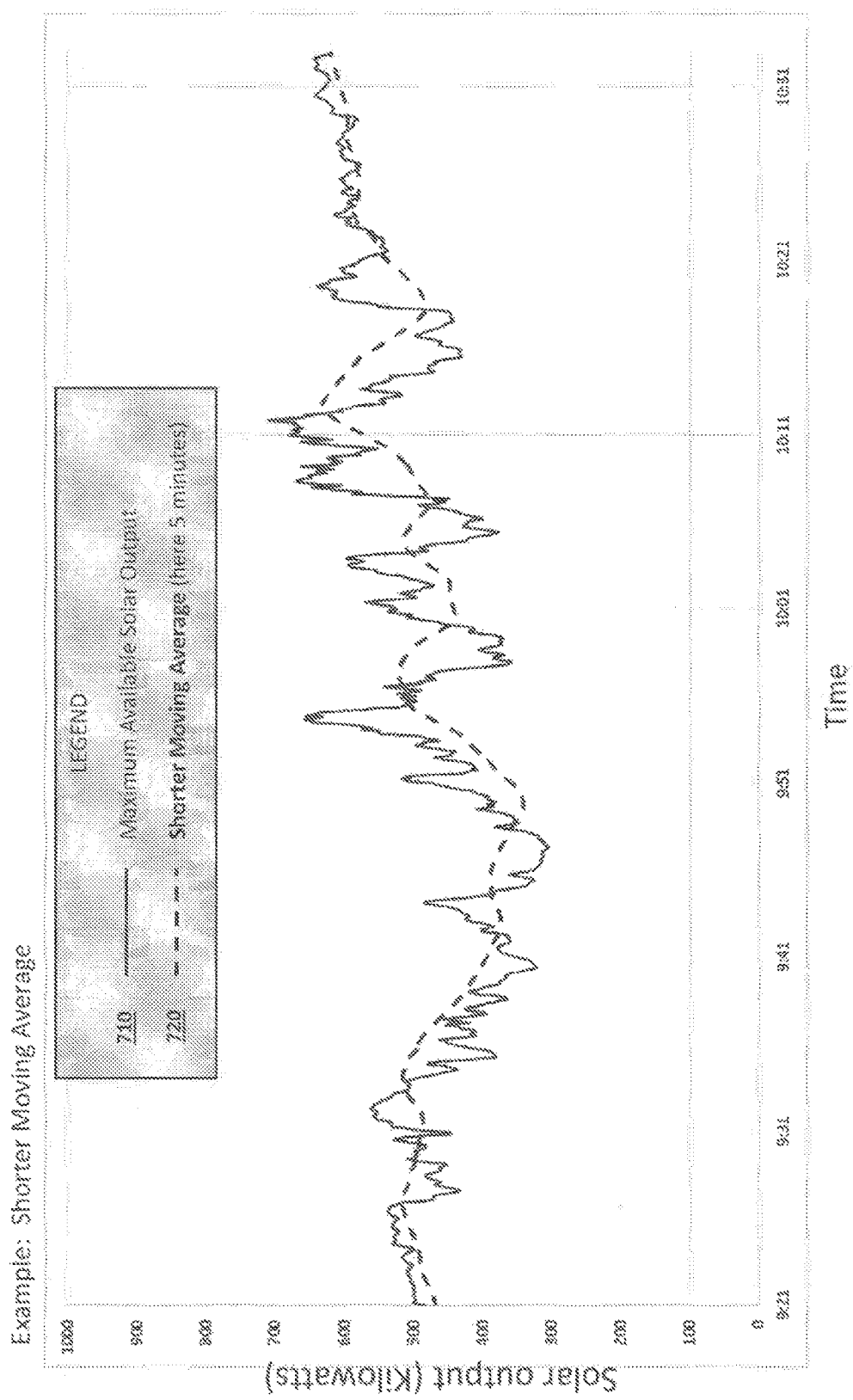
FIG. 7 illustrates an example of a Shorter Moving Average.

FIG. 7 illustrates an example of a Shorter Moving Average. In some embodiments; the facility averages the most recent five minutes of moment-to-moment values for Maximum Available Solar Output 710, here plotted as 720. Those skilled in the art will recognize that different time spans can be utilized for the Shorter Moving Average.

Figure 8:
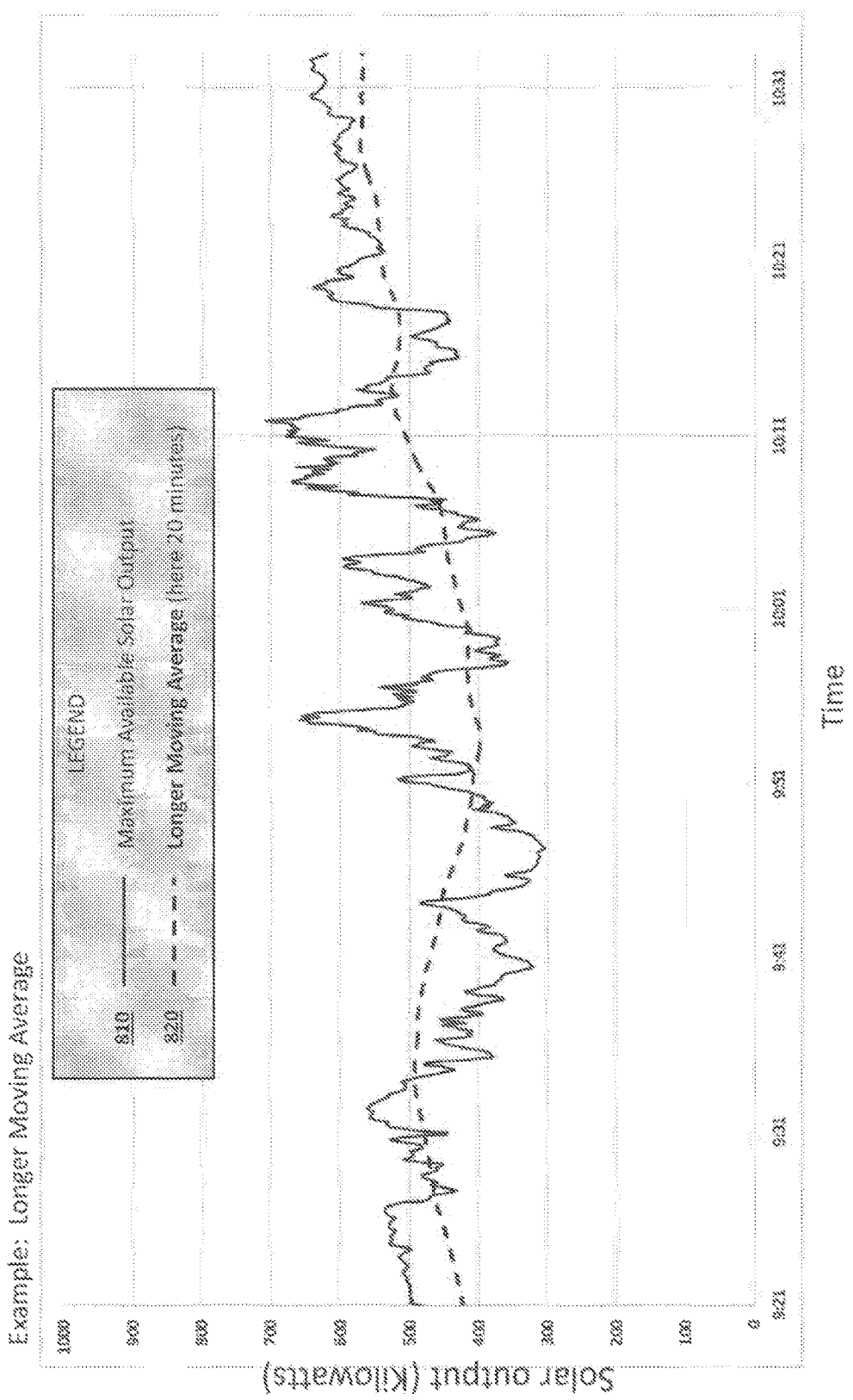
FIG. 8 illustrates an example of a Longer Moving Average.

FIG. 8 illustrates an example of a Longer Moving Average. In some embodiments; the facility averages the most recent twenty minutes of moment-to-moment values for Maximum Available Solar Output 810, here plotted as 820. Those skilled in the art will recognize that different time spans can be utilized for the Longer Moving Average.

Figure 9A:
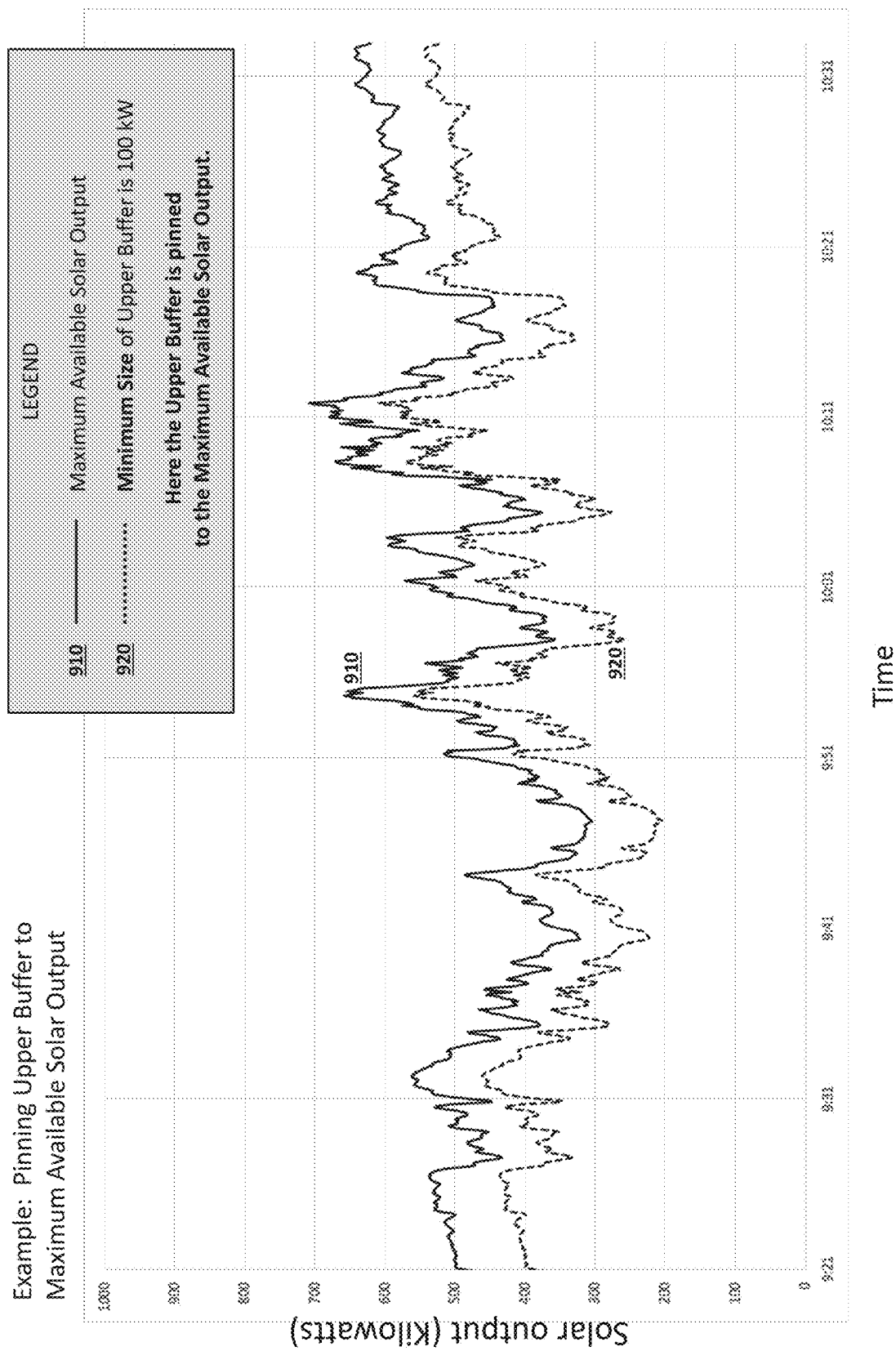
FIG. 9A illustrates an example Upper Buffer of a certain Minimum Size, pinning the Upper Buffer to the Maximum Available Solar Output.

FIG. 9A illustrates an example Upper Buffer of a certain Minimum Size, pinning the Upper Buffer to the Maximum Available Solar Output.

Here, a Minimum Size of 100 kilowatts is specified for the tipper Buffer 920, and the Upper Buffer is pinned directly to the Maximum Available Solar Output 910.

Figure 9B:
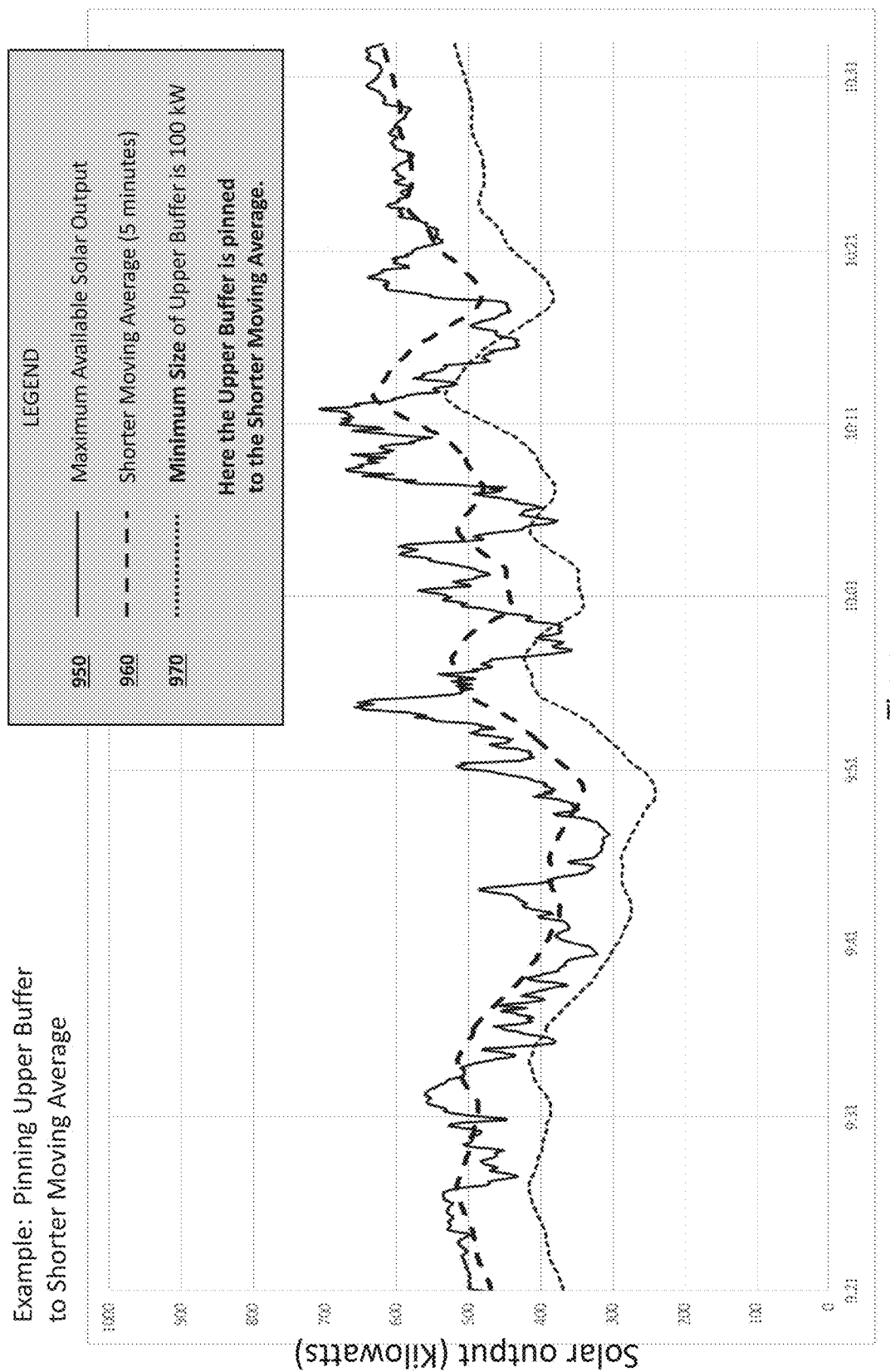
FIG. 9B illustrates an example Upper Buffer of a certain Minimum Size, pinning the Upper Buffer to the Shorter Moving Average.

FIG. 9B illustrates an example Upper Buffer of a certain Minimum Size; pinning the Upper Buffer to the Shorter Moving Average.

Here, a Minimum Size of 100 kilowatts is specified for the Upper Buffer 970, and the Upper Buffer is pinned to the Shorter Moving Average 960 (i.e. 100 kilowatts less than the Shorter Moving Average).

As shown, in some embodiments, the facility pins the Upper Buffer to various values, including the Maximum Available Solar Output (FIG. 9A); the Shorter Moving Average (FIG. 9B), or the Longer Moving Average (not shown). Pinning the Upper Buffer directly to the Maximum Available Solar Output tends to better distance the Usable Range from the interruptions of solar blockage, but yields a more volatile Usable Range (and thus a more volatile Usable Range Midpoint).

Pinning the Upper Buffer to one of the Moving Averages increases the risk of interruptions from solar blockage, but yields a more stable Usable Range (and Usable Range Midpoint). The facility's preferred approach is to pin the Upper Buffer to the Shorter Moving Average (FIG. 9B).

The next tool used by the facility in some embodiments to calculate the size of the Upper Buffer is the Moving Average Delta. FIG. 10 illustrates calculation of the Moving Average Delta, which quantifies the probability of solar blockage based on recent and current solar data (that is, by tracking Maximum Available Solar Output).

While these figures and text use the words "cloudy" or "cloudier" to represent solar blockage, many things can prevent sunlight from reaching a solar array—clouds, smoke, fog, haze, birds, airplanes, helicopters, hot air balloons, hang gliders, leaves, dust and other debris. Sources of blockage are typically difficult to predict with the degree of certainty required by grid control schemes.

Similarly, the words "sunny" and "sunnier" are used to represent moments of greater delivery of the sun's energy to the solar panel; these moments may or may not be moments when the sun appears to be higher, or brighter, or hotter.

The purpose of the Moving Average Delta is to make the size of the Upper Buffer more responsive to the volatility of solar blockage. To determine how likely it is that the sun will be blocked in the next moment, the facility calculates:

Longer Moving Average−Shorter Moving Average

In example 1010: The Maximum Available Solar Output is trending gently downward. That is, it is getting a bit cloudier. The resultant Moving Average Delta is a small positive number:

500 kilowatts−475 kilowatts=25 kilowatts

In example 1020: The Maximum Available Solar Output is trending severely downward. That is, it is getting a lot cloudier. The resultant Moving Average Delta is a larger positive number:

500 kilowatts−400 kilowatts=100 kilowatts

In example 1030: The Maximum Available Solar Output is trending gently upward. That is, it is getting a bit sunnier. The resultant Moving Average Delta is a small negative number:

500 kilowatts−525 kilowatts=—25 kilowatts

In example 1040: The Maximum Available Solar Output is trending severely upward. That is, it is getting a lot sunnier. The resultant Moving Average Delta is a larger negative number:

500 kilowatts−600 kilowatts=—100 kilowatts

Figure 11:
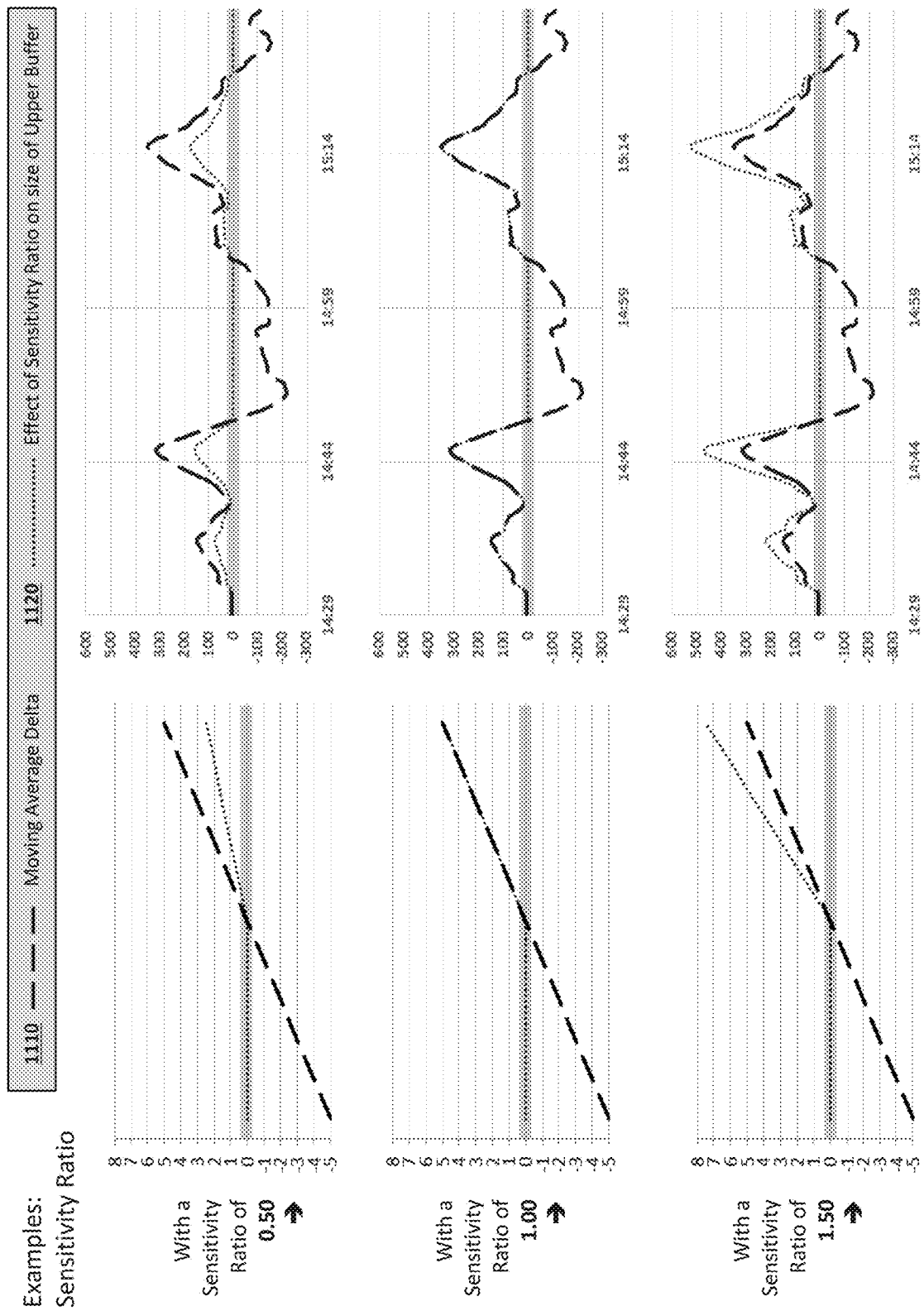
FIG. 11 illustrates how the Moving Average Delta affects the size of the Upper Buffer, introducing a Sensitivity Ratio to control this effect.

FIG. 11 illustrates how the Moving Average Delta affects the size of the Upper Buffer, and in some embodiments introducing a Sensitivity Ratio to control this effect.

In applying Moving Average Delta to the size of the Upper Buffer, in some embodiments the facility ignores negative values. That is, if it is trending sunnier (Moving Average Delta is negative), the facility determines the size of the tipper Buffer based upon Minimum Size alone. Only if it is trending cloudier (Moving Average Delta is positive) does the facility increase the size of the Upper Buffer beyond the Minimum Size.

In some embodiments, the facility uses a Sensitivity Ratio to control the degree of effect that Moving Average Delta has on the size of the Upper Buffer.

On all six charts shown in FIG. 11, the heavy dashed line 1110 represents Moving Average Delta, and the dotted line 1120 represents the combined effect of Moving Average Delta and Sensitivity Ratio on the size of the Upper Buffer.

On the three left-most charts, a simple, linear Moving Average Delta and the resultant effect of Sensitivity Ratio illustrate the relationship between the two values.

On the three right-most charts, Moving Average Delta over a portion of a sample solar day is used to illustrate the effect of Sensitivity Ratio in real time.

On the top row of charts, the Sensitivity Ratio is 050. On the middle row of charts, the Sensitivity Ratio is 1.00. On the bottom row of charts. the Sensitivity Ratio is 1.50.

FIG. 12 illustrates how the size of an Upper Buffer 1220 responds to various settings of Minimum Size and Sensitivity Ratio, given a Moving Average Delta 1210 over a portion of a sample solar day.

In various embodiments, these parameters (Minimum Size and Sensitivity Ratio) are settable by the user of the facility. For example, in some embodiments the facility adjusts these settings daily. In some embodiments, the facility adjusts these settings based on current conditions on both the supply side (how much volatility in solar output is anticipated) and the demand side (how much volatility in circuit load is anticipated).

On the supply side, in various embodiments the facility adjusts these settings in response to the climatological and seasonal weather patterns at the location of the PV array; based on weather forecasts and personal observations of weather patterns, such as "What type of cloud day is this?"

For example, if local weather patterns are indicating either a full-sun day or a low-blanket-cloud-cover day, the volatility on the supply side is likely to be low, so in some embodiments the facility sets the parameters Minimum Size and Sensitivity Ratio to lower values. If local weather patterns are indicating a come-and-go-cloud day, in some embodiments the facility sets the parameters Minimum Size and Sensitivity Ratio to higher, more conservative values.

On the demand side, in various embodiments the facility adjusts these parameters higher or lower to response to the "neediness" of the electrical grid on a given day, and/or the relative "stiffness" or resilience of the local grid in dealing with the volatility of customer load.

Figure 13A:
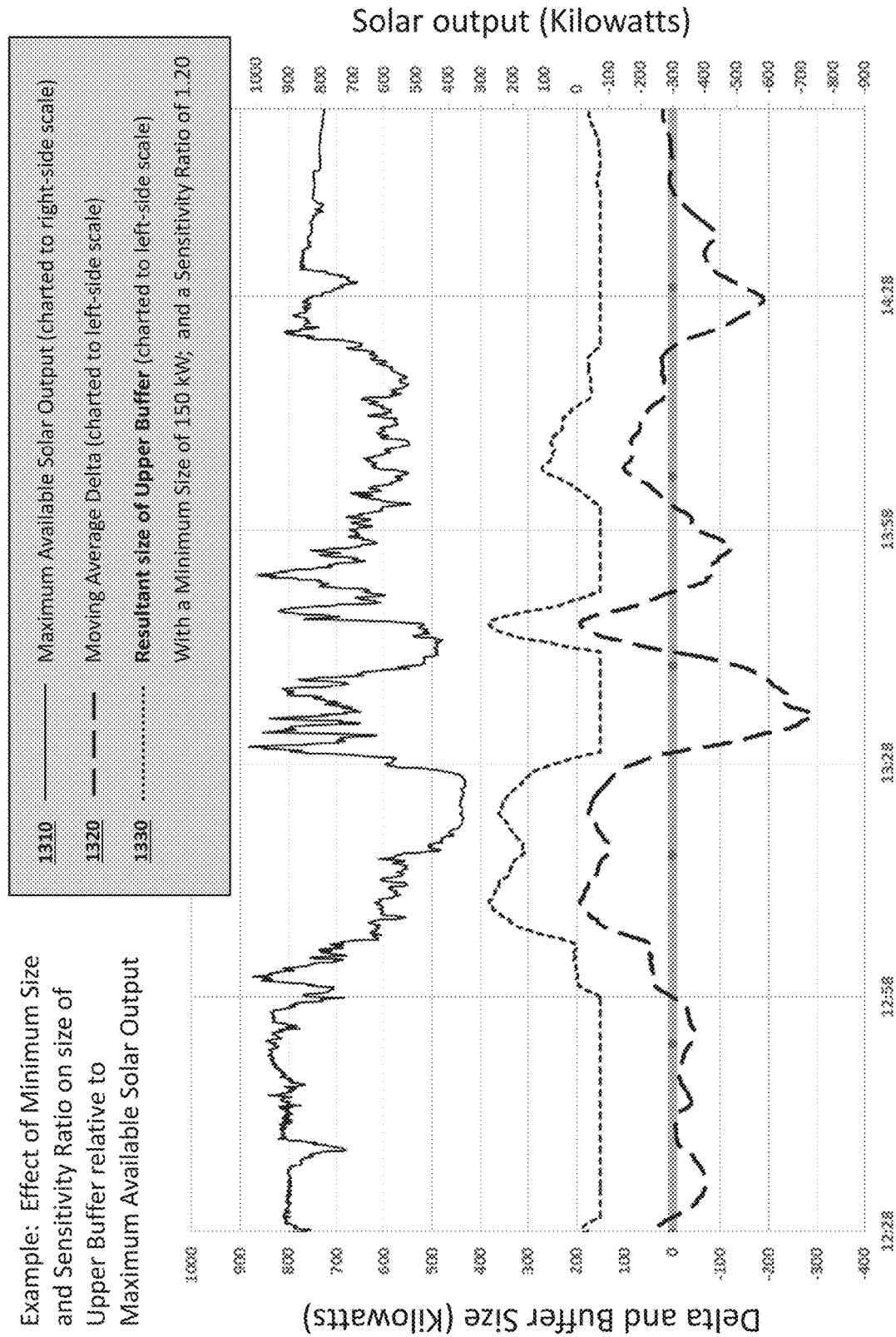
FIG. 13A charts an example Minimum Size and Sensitivity Ratio on the size of an Upper Buffer relative to Maximum Available Solar Output.

FIG. 13A charts an example Minimum Size and Sensitivity Ratio on the size of an Upper Buffer relative to Maximum Available Solar Output over a portion of a sample solar day.

The Maximum Available Solar Output 1310 is charted to the right-side axis. The associated Moving Average Delta 1320 is charted to the left-size axis. Given a Minimum Size of 150 kilowatts and a Sensitivity Ratio of 1.20, the resultant size of the Upper Buffer is also charted to the left-size axis.

Figure 13B:
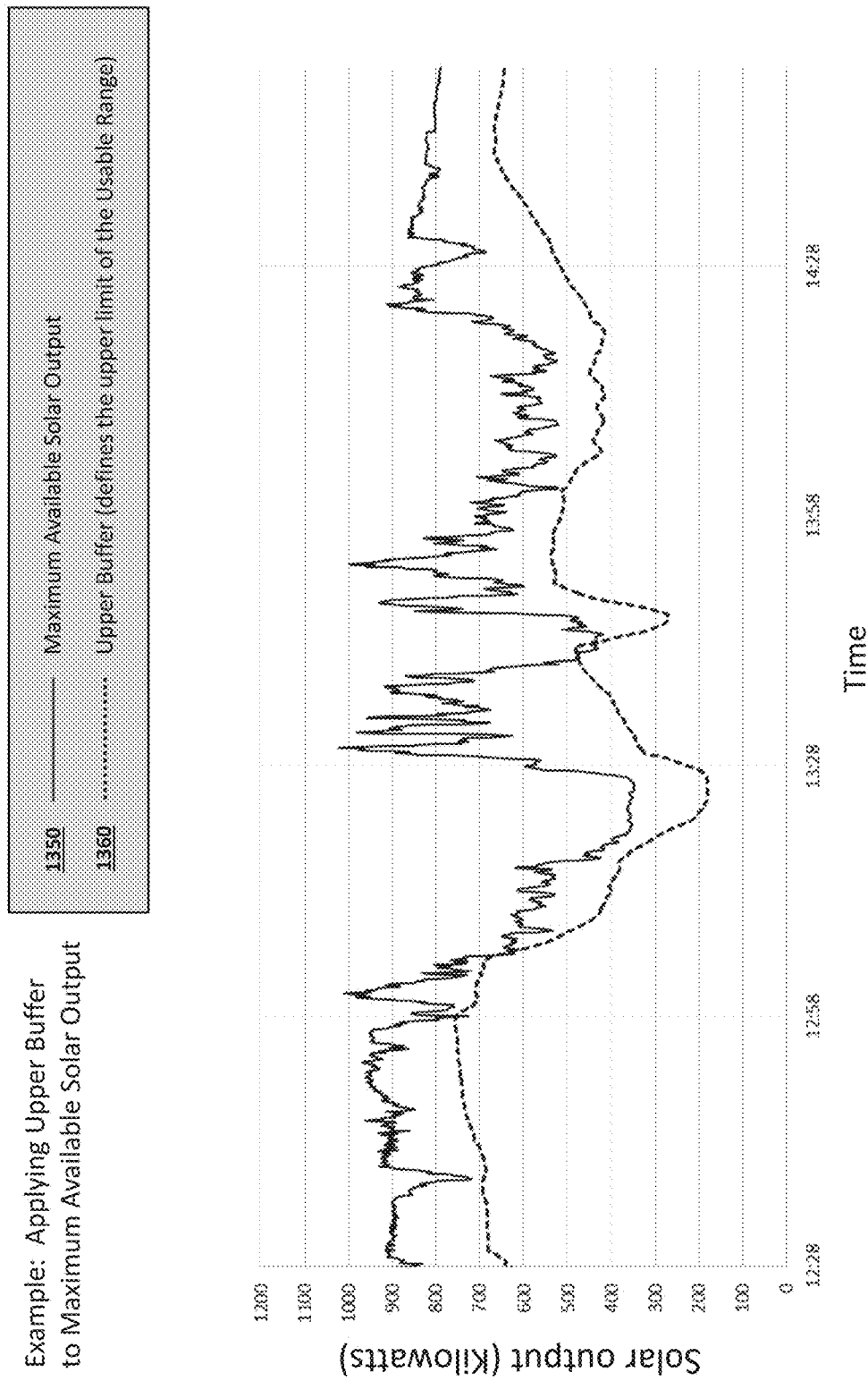
FIG. 13B illustrates this same Upper Buffer applied to the Maximum Available Solar Output, thus defining the upper limit of the Usable Range.

FIG. 13B illustrates this same Upper Buffer (the same solar data as in FIG. 13A) applied to the Maximum Available Solar Output, thus illustrating the upper limit of the Usable Range on one axis.

Note that, in this example, the Upper Buffer is not perfect in preventing solar blockage from cutting into the Usable Range, but that it is substantially successful in doing so.

Figure 14:
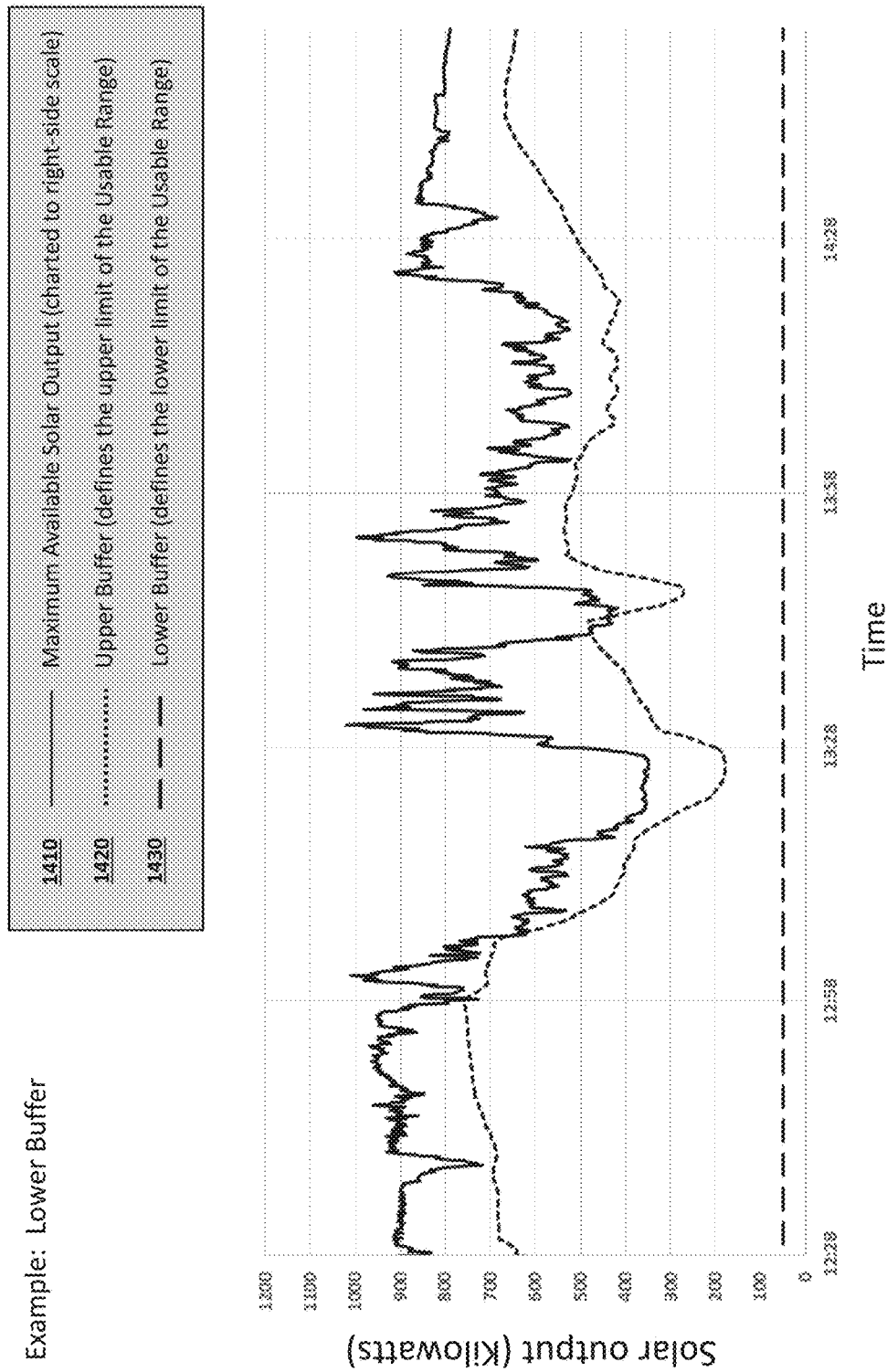
FIG. 14 adds a sample Lower Buffer to the same portion of a solar day.

FIG. 14 adds a sample Lower Buffer to the same portion of a solar day. The Lower Buffer distances the Usable Range from the inherent instability of some solar inverters when asked to attenuate large amounts of solar energy at low power output levels relative to their rated power capacity.

The facility calculates the Lower Buffer as a percentage of the rated capacity of the PV solar array. Here, the rated capacity of the controlled solar array is 1000 kilowatts, and the Lower Buffer is set at 5% of that capacity. thus 50 kilowatts. In various embodiments, the facility sets this Lower Buffer at various percentages of capacity, based on the relative efficiency of the inverter(s) being used, such as 5% of rated capacity.

Figure 15:
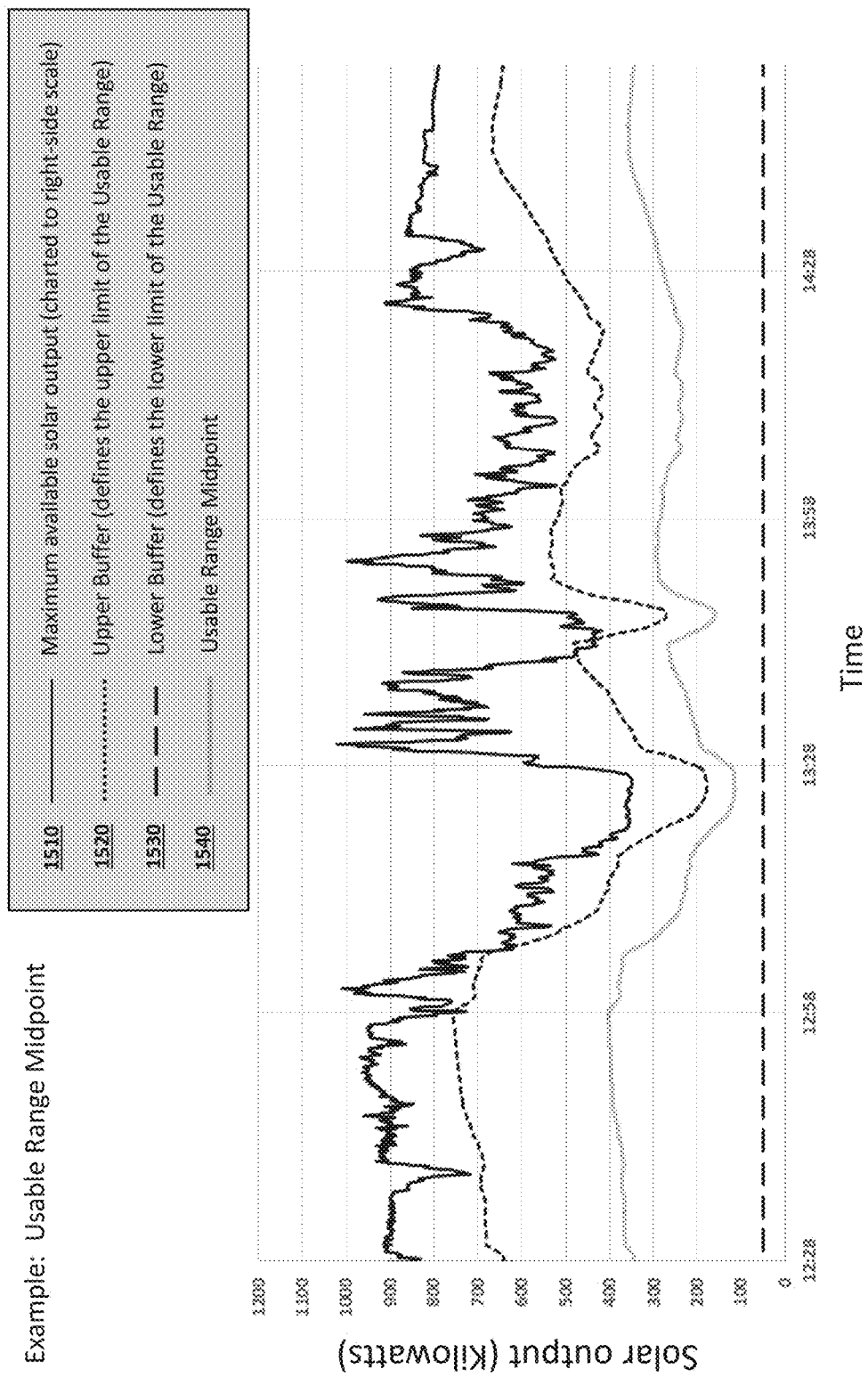
FIG. 15 adds the calculated Usable Range Midpoint to this same portion of a solar day.

In some embodiments, the facility includes use of the Usable Range Midpoint. FIG. 15 adds the calculated Usable Range Midpoint to this same portion of a solar day. Moment to moment, this Midpoint is equidistant from the upper and lower limits of the Usable Range. This Midpoint is useful to grid control schemes like AGO that request a delta of real power output—sometimes asking for more, sometimes asking for less—relative to a baseline. It is also useful to manual grid operators who want to be in a position to respond to grid conditions in either direction—sometimes up, sometimes down—relative to a baseline. This Midpoint provides that baseline.

For example, a typical AGC command is "give me 20 more kilowatts of real power." The AGC program is not asking for a specific quantity of total solar output, it is saying "whatever you were giving me a moment ago, now give me 20 kilowatts more than that." By pinning its response to AGC commands to the Midpoint of the Usable Range, this facility both (a) delivers to the electric grid the most solar output it can reliably deliver, and (b) responds to the specific requests of the AGO program to help condition frequency on the electrical grid.

The Usable Range Midpoint on which the facility bases its responses is itself a continuously moving value. Depending on solar conditions and parameter settings, a grid control scheme (like AGC) can receive more or less energy than it requested. This is an essential trade-off necessary to utilize the best of solar. Solar will not always be available, and the amount of solar that is available will inevitably incorporate a degree of up-and-down variability. The facility quantifies, manages and minimizes this "sometime" quality of solar, but it does not eliminate it.

Typically, grid control schemes like AGC calculate the needs of the system, and then distribute the resultant commands (requests for more or less real power) among multiple energy resources. Typically, these commands are divided in fixed proportions among the available resources. The facility enables grid control schemes to divide their commands in dynamic proportions, responding to solar availability as the facility defines it throughout the day.

In some embodiments, the facility is incorporated into the grid as a "black box" that responds to requests for power as described above. The facility can also effectively engage power control schemes like AGC in a two-way dialogue. In basing its responses to AGC commands on the Midpoint of the Usable Range, the facility accomplishes three things: (a) delivering the most solar output it can reliably deliver, (b) responding typically to the specific requests of the AGO program, and importantly (c) giving the AGO program dynamic feedback about the latest availability of solar energy, which the AGO program can then incorporate into formulating its next request.

It is a distinct advantage of the facility that, in some embodiments, it can respond to AGC requests in a nuanced way, delivering specific deltas of real power (e.g., 10 kilowatts more, 25 kilowatts less) in real time. Often, AGC requests are sent to resources (like energy storage systems) that are programmed to respond only in an all-or-nothing fashion, turning on when system frequency is in need of conditioning, and then turning off when system frequency has returned to an acceptable range.

It is a distinct advantage of the facility that, in some embodiments, it can respond to any electrical grid control scheme (AGC being only one of them) that issues commands for greater or lesser real energy to regulate other system parameters.

It is a distinct advantage of the facility that, in some embodiments, in responding to electrical grid control schemes like Frequency Response and Volt/Watt, it enables the PV array itself to respond dynamically to the frequency and voltage volatility that it itself is potentially introducing into the grid.

Those skilled in the art will recognize that other electrical grid control schemes may request real power in other ways. The facility makes available to any such control scheme a Usable Range of real power available, and a Midpoint of Usable Range as a baseline.

FIGS. 16A, 17A, 18A, and 19A illustrate the Upper Buffer, Lower Buffer, Usable Range, and Usable Range Midpoint for four sample solar days.

Figure 16A:
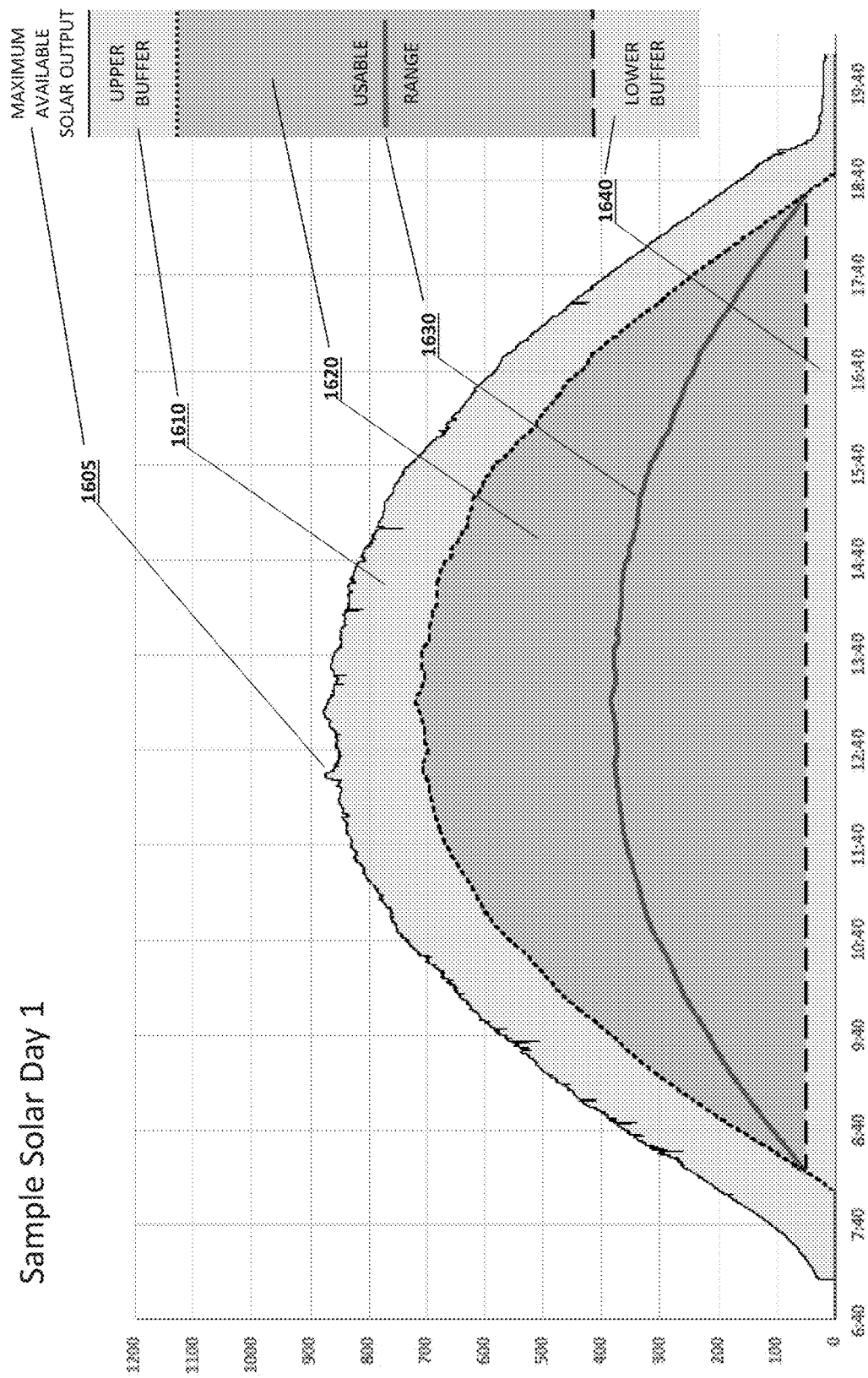
FIGS. 16A, 17A, 18A, and 19A illustrate the Upper Buffer, Lower Buffer, Usable Range, and Midpoint of Usable Range for four sample solar days.

Key elements for all four of these charts are identified on FIG. 16A as follows—

The top-most line 1605 is the Maximum Available Solar Output. The Upper Buffer 1610 is defined to reduce the likelihood that solar blockage will affect the Usable Range. The Usable Range 1620 identifies the most reliable portion of solar energy available. The Midpoint of the Usable Range 1630 is useful to grid control schemes such as AGC as a baseline for requesting greater or lesser real power output from the PV arrays through the facility. The Lower Buffer 1640 distances the Usable Range from solar inverter instability.

For each sample day, the figures in the following table indicate how reliably available solar energy is within the Usable Range as defined by the facility:

| Sample Solar Day | Overall availability of energy within the Usable Range | Percentage of time the full Usable Range was available |
| --- | --- | --- |
| 1 (FIG. 16A) | 100% | 100% |
| 2 (FIG. 17A) | 99.85% | 98.82% |
| 3 (FIG. 18A) | 97.97% | 91.85% |
| 4 (FIG. 19A) | 98.40% | 93.93% |

"Overall availability of energy within the Usable Range:" Looking at the entire day, what percentage of the Usable Range as defined by the facility (the medium grey area on the charts) was actually available for dispatch (stayed within Maximum Available Solar Output)? That is, how effective is the facility in filtering out solar intermittency?

"Percentage of time the full Usable Range was available:" If, every five seconds throughout the day, a grid control scheme requested the full Usable Range as defined by the facility, what percentage of those requests would be successfully fulfilled?

For an ideal solar day (like Sample Solar Day 1), is it easy to achieve 100% availability in the two categories described above. For more complex solar days (like Sample Solar Days 2, 3, and 4), achieving high availability is much more challenging.

In comparison, the figures in the following table indicate how reliably available solar energy would have been without using the facility, and thus without defining a Usable Range.

Having no facility for doing otherwise, the utility can only observe how actual solar availability falls far short of an ideal solar curve (as represented by Sample Solar Day 1):

| Sample Solar Day (compared to the ideal) | Overall availability of solar energy | Percentage of time solar energy was fully available |
| --- | --- | --- |
| 1 (FIG. 16A) | 100% | 100% |
| 2 (FIG. 17A) | 87.63% | 25.97% |
| 3 (FIG. 18A) | 74.22% | 30.87% |

-continued

| Sample Solar Day (compared to the ideal) | Overall availability of solar energy | Percentage of time solar energy was fully available |
| --- | --- | --- |
| 4 (FIG. 19A) | 85.64% | 30.48% |

"Overall availability of solar energy:" Looking at the entire day, what percentage of an ideal solar curve (equal to Sample Solar Day 1) was available for dispatch (stayed within Maximum Available Solar Output)?

"Percentage of time solar energy was fully available:" If, every five seconds throughout the day, a grid control scheme requested all of an ideal solar curve (equal to Sample Solar Day 1), what percentage of those requests would be successfully fulfilled?

FIGS. 16B, 17B, 188, and 19B illustrate the applied performance of the facility by charting actual energy requests issued by a grid control scheme such as AGC for the same four sample solar days. These sample energy requests are modeled in response to typical frequency regulation signals, and are then scaled to match the Usable Range.

Figure 16B:
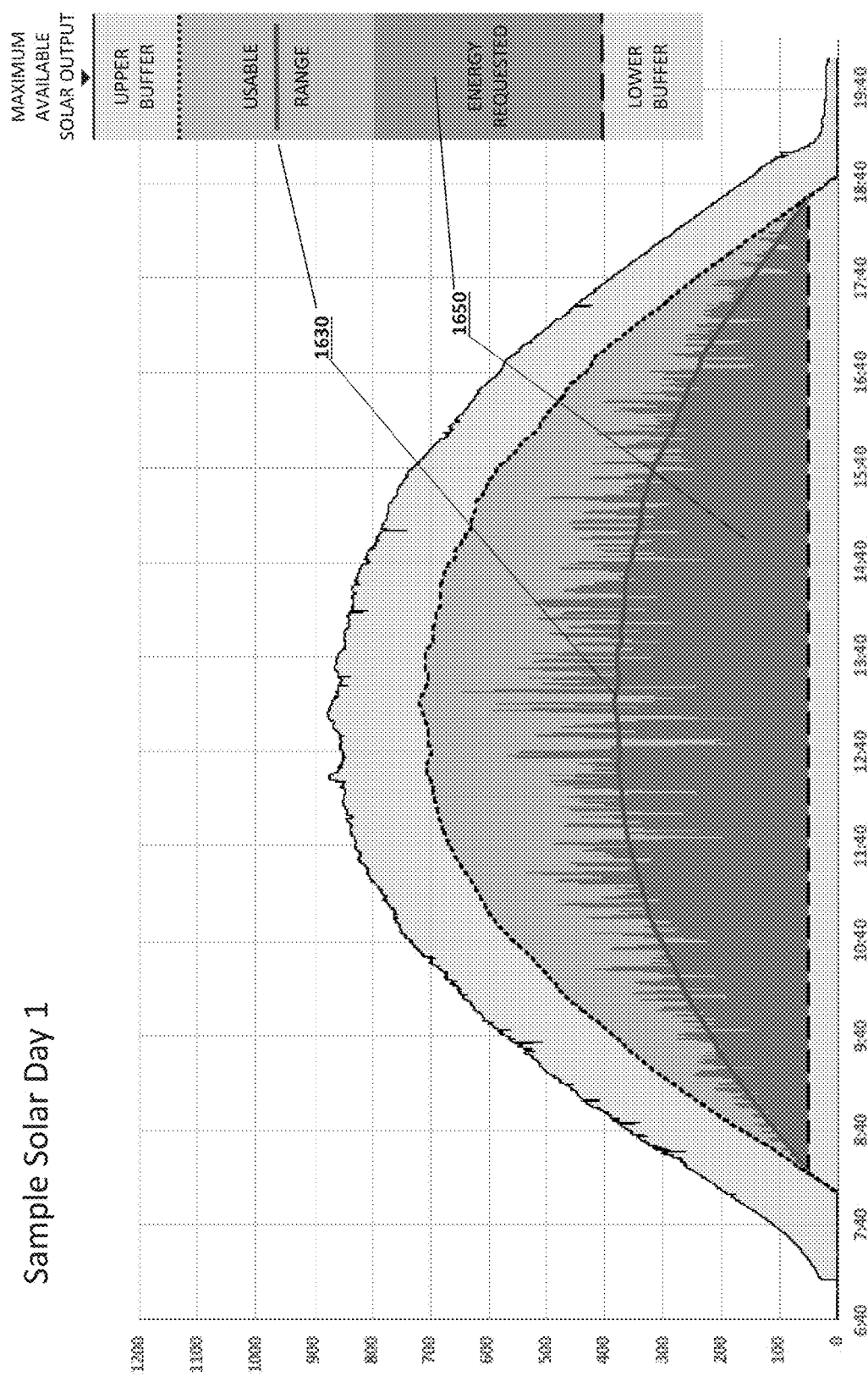
FIGS. 16B, 17B, 18B, and 19B illustrate the applied performance of the facility by charting actual energy requests issued by a grid control scheme such as AGC for the same four sample solar days.
Figure 17A:
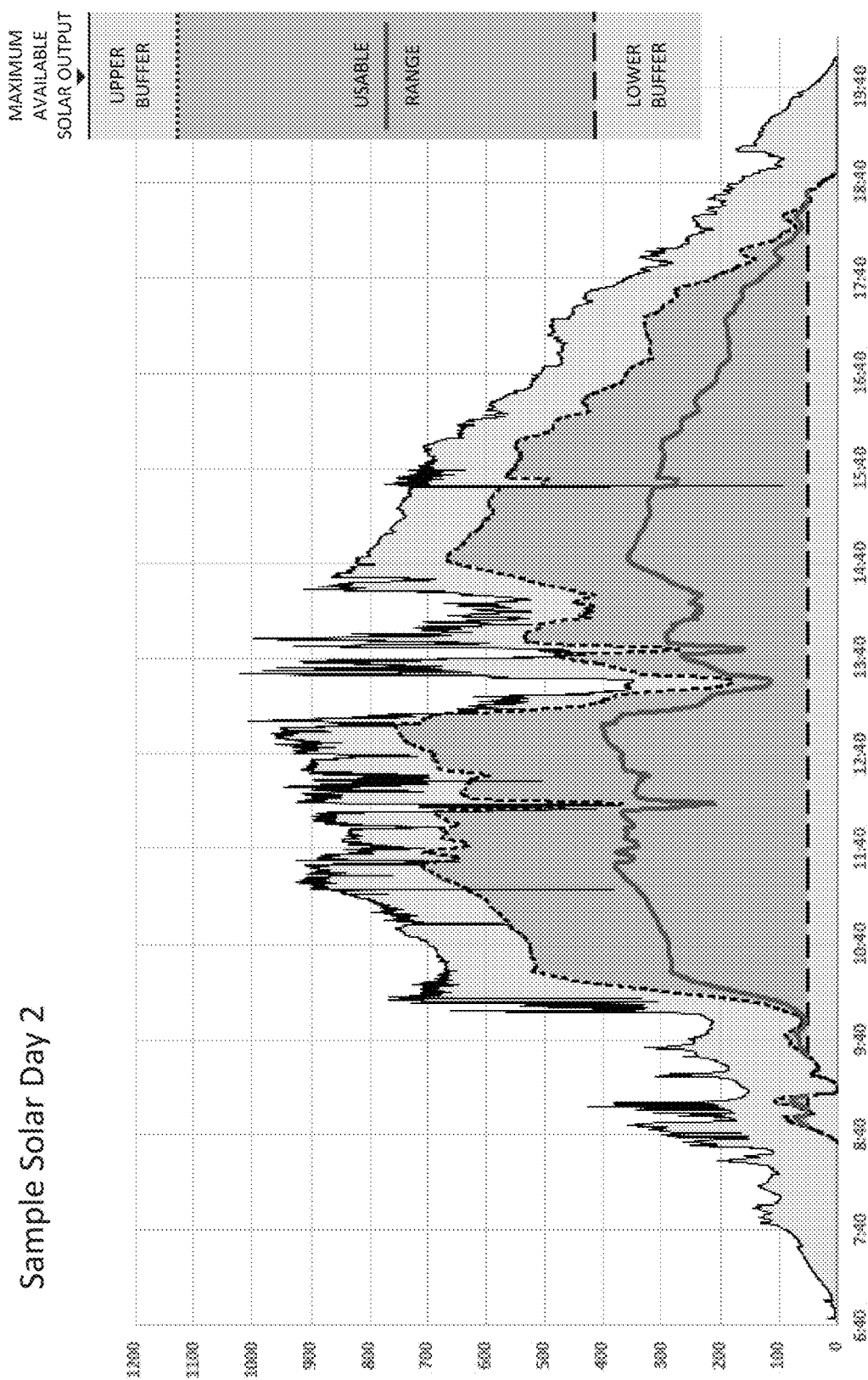
Figure 17B:
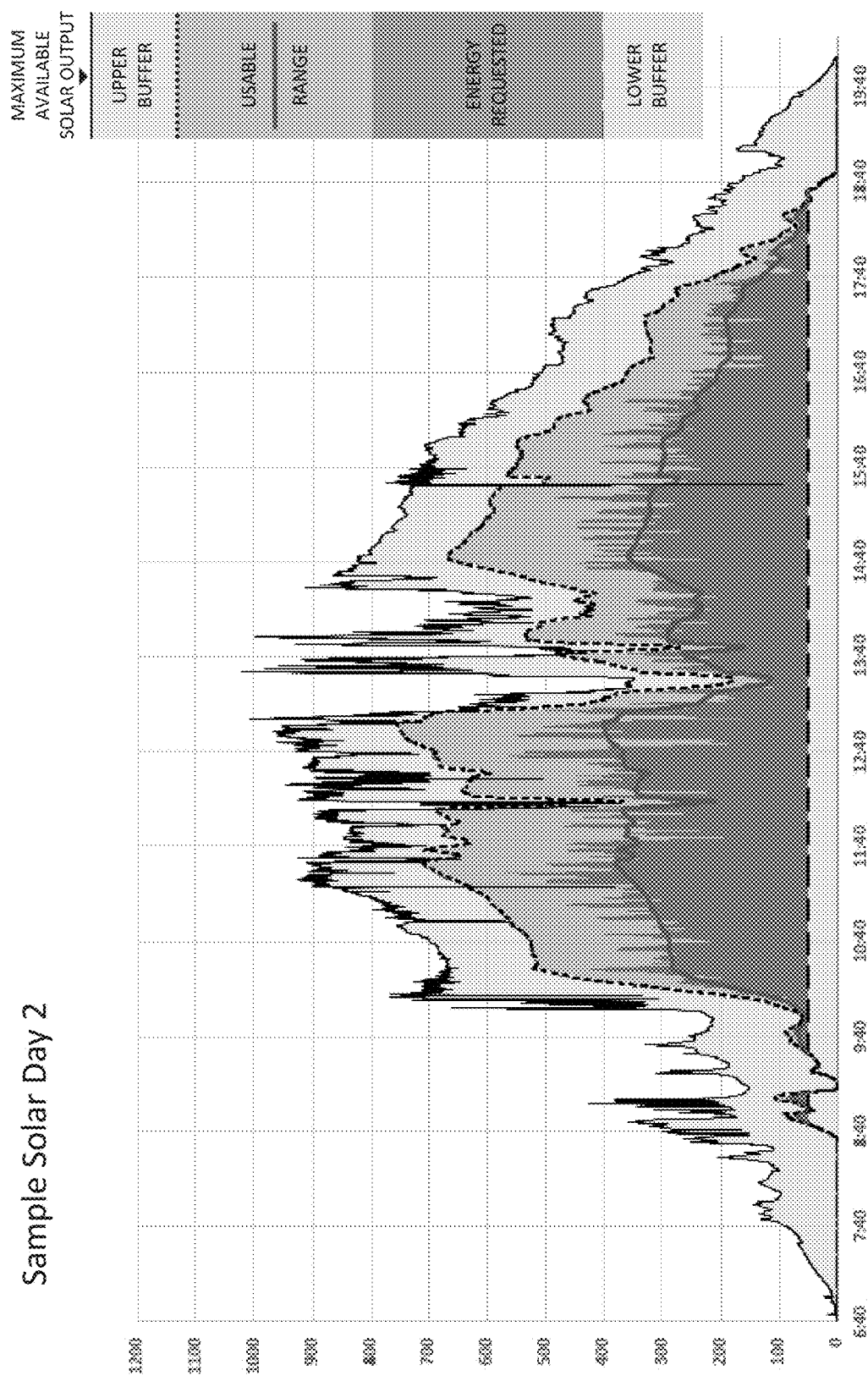

Key elements for all four of these charts are identified on FIG. 16B as follows: The Midpoint of the Usable Range 1630 is useful to grid control schemes to use as a baseline for energy requests. In response to a typical series of such requests, a range of energy 1650 is requested for use.

Figure 18A:
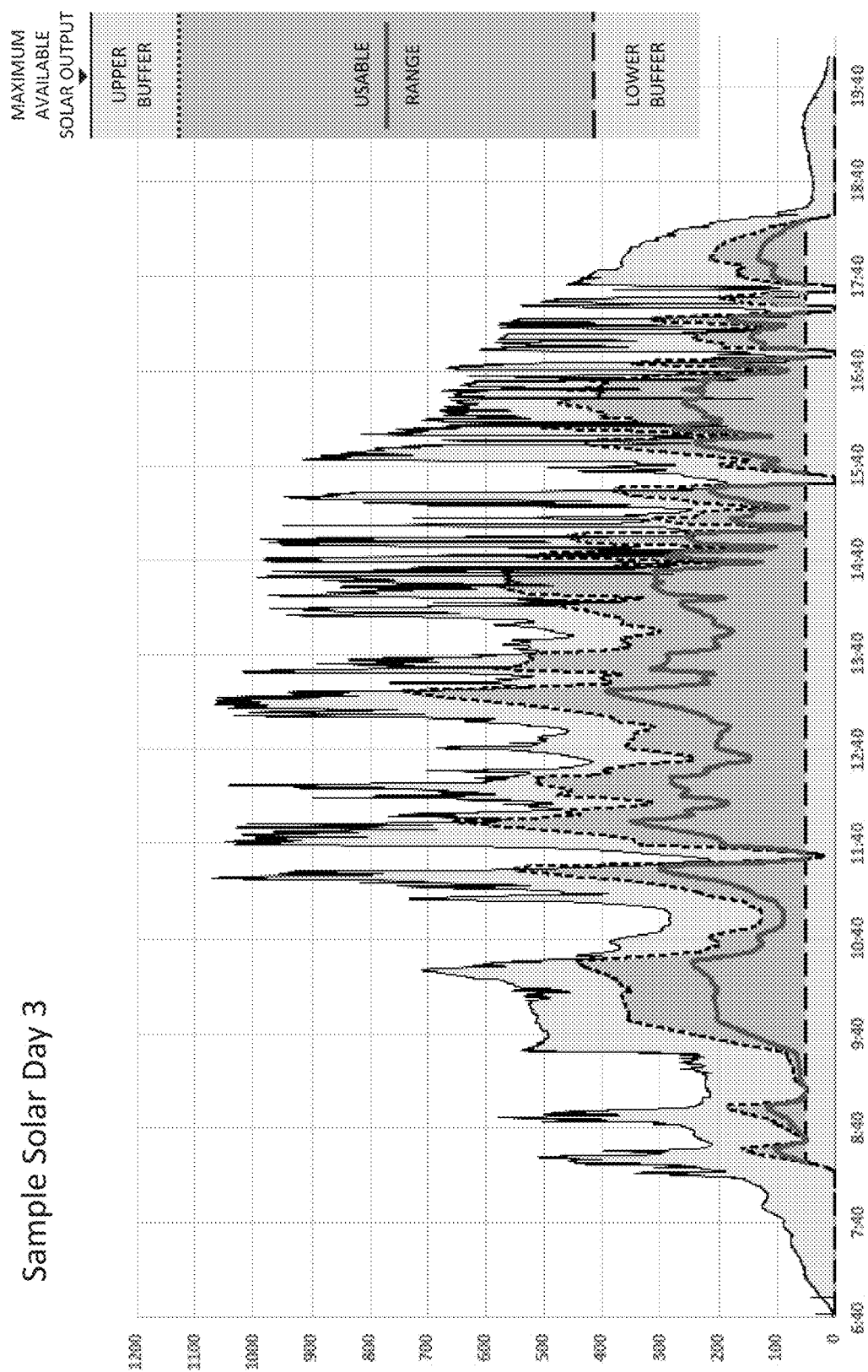
Figure 18B:
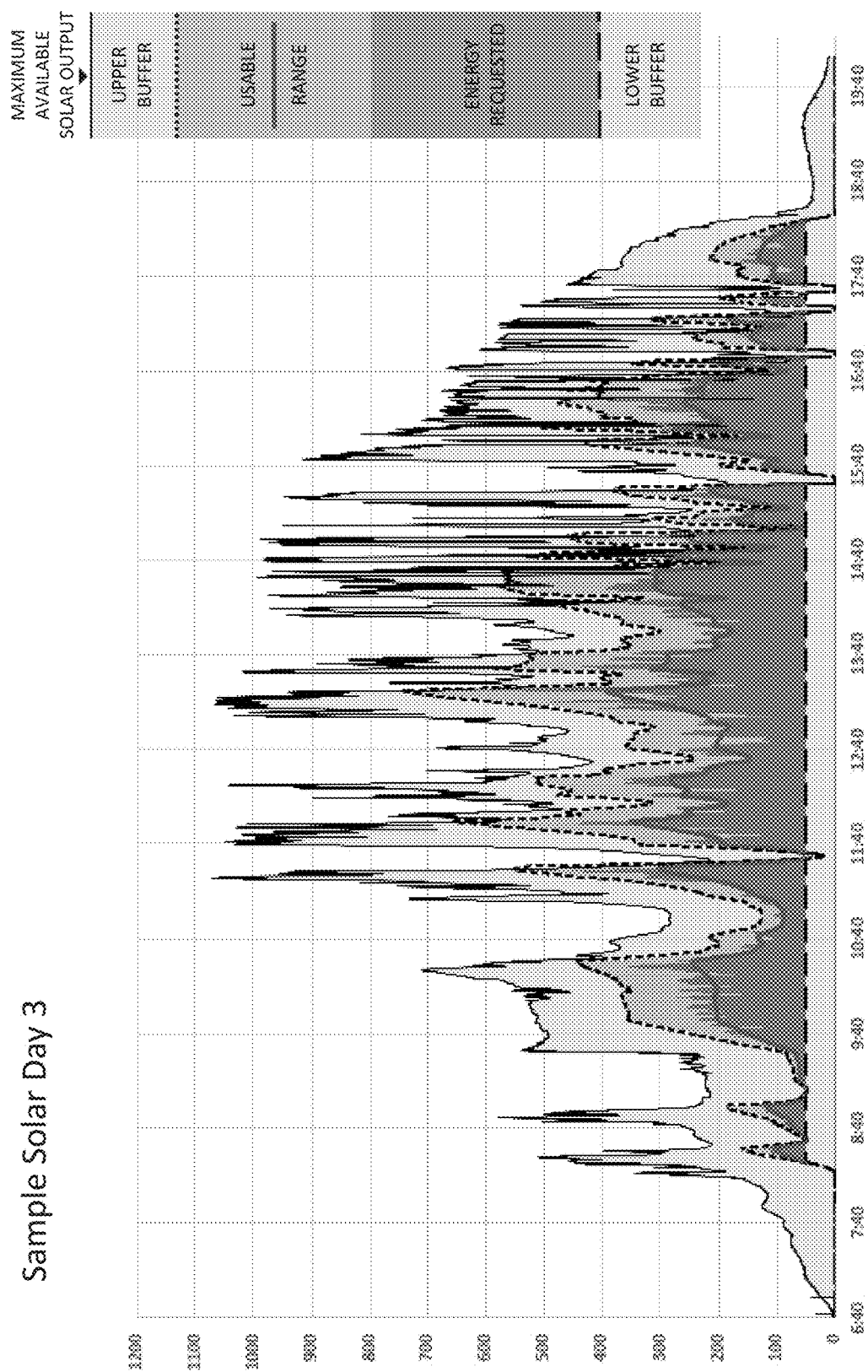
Figure 19A:
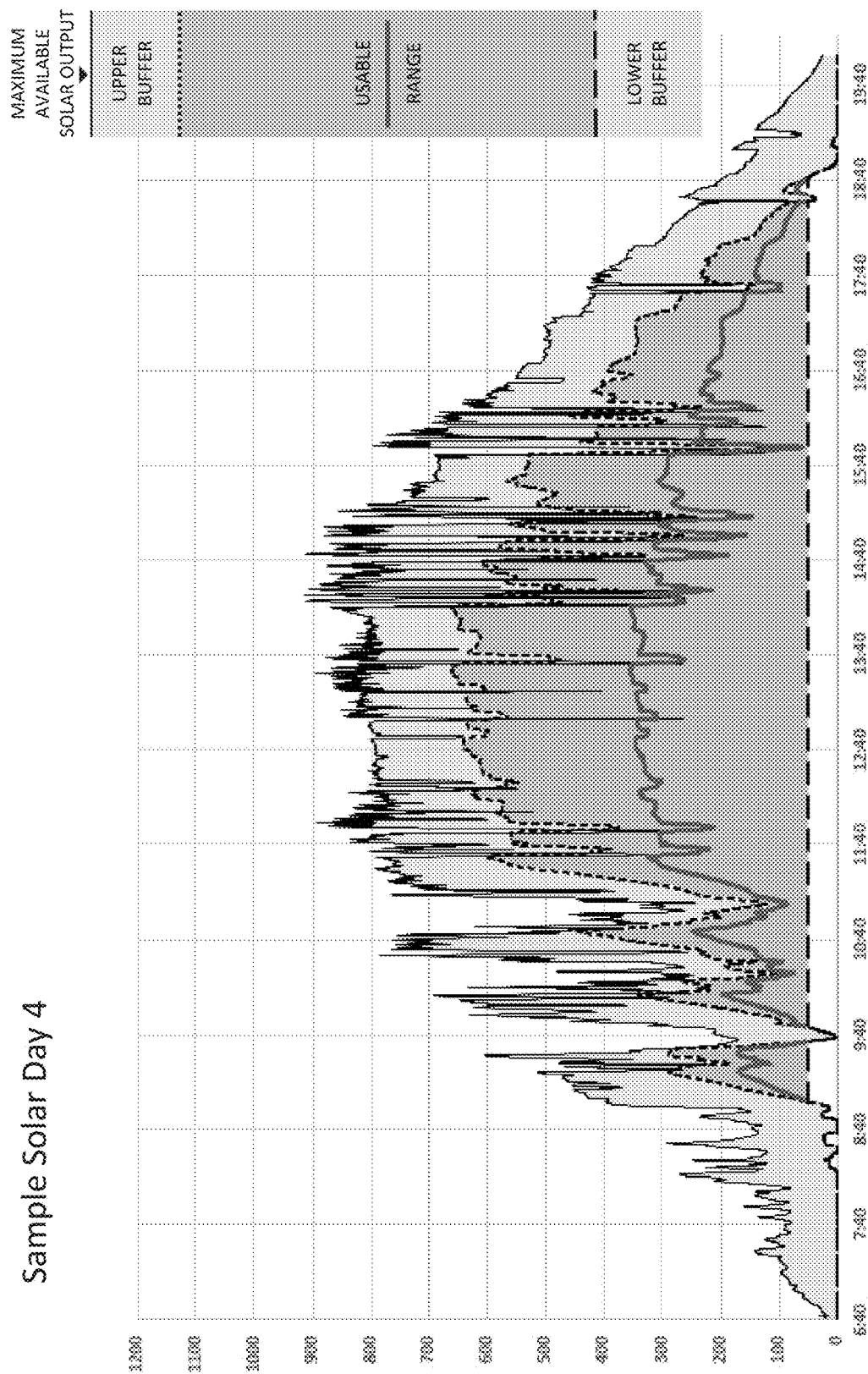
Figure 19B:
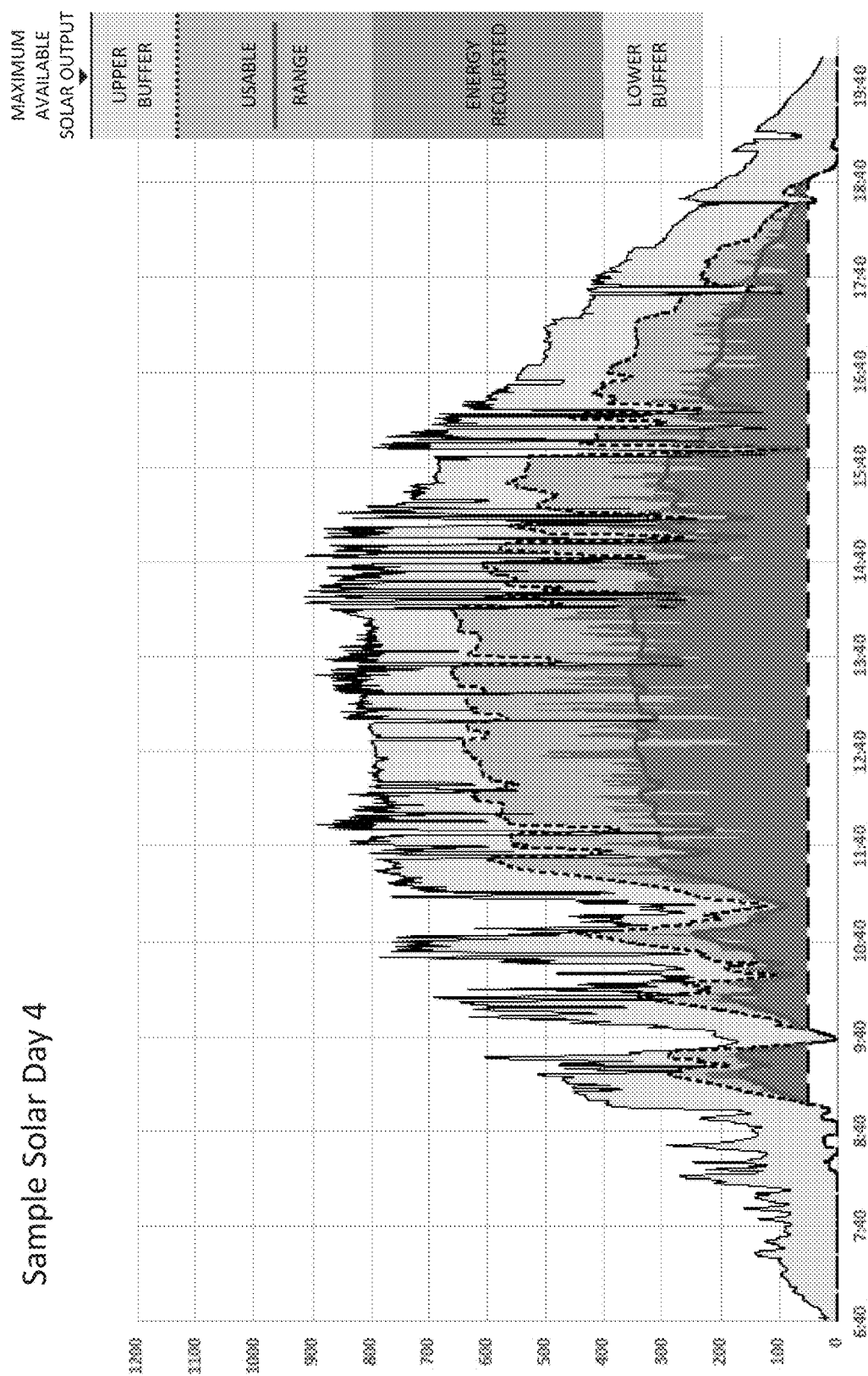

For each sample day, the figures in the following table indicate how reliably these energy requests were honored:

| Sample Solar Day | Overall availability of requested energy | Percentage of time the requests were fully honored |
| --- | --- | --- |
| 1 (FIG. 16B) | 100% | 100% |
| 2 (FIG. 17B) | 99.99% | 99.99% |
| 3 (FIG. 18B) | 99.37% | 97.26% |
| 4 (FIG. 19B) | 99.62% | 98.36% |

"Overall availability of requested energy:" Looking at the entire day, what percentage of the requested energy (the dark grey area on the charts) was actually available for dispatch (stayed within Maximum Available Solar Output)? That is, how effective is the facility in reliably delivering requested energy to the grid?

"Percentage of time the requests were fully honored:" If, every five seconds throughout the day, a grid control scheme made typical energy requests (the dark grey area on the charts), what percentage of those requests would be successfully fulfilled?

Even when the availability of solar energy is low, the performance of the responsive solar algorithm in responding to energy requests can be high.

By using the facility, the applied performance of solar can be workably dispatchable.

In various embodiments, the facility performs in similar ways to manage the output of energy generation resources of a variety of other types, including renewable energy generation resources such as wind, geothermal, hydro, wave, and tidal energy generation resources.

It will be appreciated by those skilled in the art that the above-described facility may be straightforwardly adapted or extended in various ways. While the foregoing description makes reference to particular embodiments, the scope of the invention is defined solely by the claims that follow and the elements recited explicitly therein.

We claim:

1. A system, comprising:
  first solar panels configured to receive control instructions from a controller;
  second solar panels independent of control by the controller; and
  the controller configured to:
    determine a range of available production rates, between an upper buffer and a non-zero lower buffer of an available solar output, at which the first solar panels are likely to deliver electrical energy to an electric grid based on a present output of the second solar panels;
    determine a time-variable usable range midpoint between the upper buffer and the non-zero lower buffer;
    generate a control command based on the time-variable usable range midpoint between the upper buffer and the non-zero lower buffer; and
    communicate the control command to at least one first solar panel of the first solar panels to cause a component of the first solar panels to actuate to control a rate at which the electrical energy is delivered to the electric grid, wherein the rate at which the electrical energy is delivered is within the range of available production rates.

2. The system of claim 1, wherein the second solar panels are in vicinity of the first solar panels and subject to same environmental conditions as the first solar panels.

3. The system of claim 1, wherein the upper buffer and the time-variable usable range midpoint vary over time in accordance with solar data.

4. The system of claim 1, wherein the controller is configured to:
  deliver a sub-maximum rate at which the electrical energy is delivered that is in a range between the non-zero lower buffer and a maximum rate of energy output; and
  refuse a request for the electrical energy if the rate at which the electrical energy is delivered is below the non-zero lower buffer.

5. The system of claim 1, wherein the controller is configured to:
  determine a frequency at which the electrical energy is being provided via the electric grid; and
  generate an indication of the rate at which the electrical energy is delivered from the first solar panels based on the frequency.

6. The system of claim 1, wherein the controller is configured to determine the range of available production rates at which the first solar panels are likely to be able to deliver energy at one or more future times based on past and the present output of the second solar panels.

7. The system of claim 1, wherein the range of available production rates is discounted from a theoretical maximum rate.

8. A computer-implemented method for determining a rate to deliver energy, the computer-implemented method comprising:
  receiving, via a controller, an indication of a non-zero rate of energy output needed from a production array of solar panels coupled to the controller;
  determining a range of available production rates, between an upper buffer and a non-zero lower buffer of an available solar output, at which the production array of solar panels is likely to deliver the energy at one or more future times, wherein the range of available production rates is determined based on a present output of a sentinel array of solar panels, wherein the upper buffer varies over time in accordance with solar data;
  determining that the non-zero rate of energy output is between the range of available production rates; and
  based on the non-zero rate of energy output being between the range of available production rates, generating, via the controller, a control signal that is communicated to the production array of solar panels to cause the production array of solar panels to deliver a particular rate of energy output that is equal to or greater than the non-zero rate of energy output.

9. The computer-implemented method of claim 8, wherein the sentinel array of solar panels is in vicinity of the production array of solar panels and subjected to same environmental conditions as the production array of solar panels.

10. The computer-implemented method of claim 8, wherein the particular rate of energy output is determined to be within the range of available production rates from the production array of solar panels.

11. The computer-implemented method of claim 8, wherein the sentinel array of solar panels is smaller than the production array of solar panels.

12. The computer-implemented method of claim 8, wherein the controller is controllable to deliver each of (a) a maximum rate of energy output and (b) one or more sub-maximum rates of energy output that is each at a different point in a range between the non-zero lower buffer and the maximum rate of energy output, the method further comprising:
  controlling the controller to deliver a sub-maximum rate of energy output; and
  controlling the controller to refuse a request with the indication of the non-zero rate of energy output needed that is below the non-zero lower buffer.

13. The computer-implemented method of claim 8, wherein the range of available production rates are further determined based on a past output of the sentinel array of solar panels.

14. The computer-implemented method of claim 8, further comprising:
  determining a frequency at which the energy is being provided via an electric grid; and
  generating the indication of the non-zero rate of energy output needed from the production array of solar panels based on the determined frequency.

15. A non-transitory computer readable storage medium with instructions stored thereon that, when executed by a computing system, perform operations for controlling energy, the operations comprising:
  receiving an indication of a rate of energy output sought from a production array of solar panels coupled to a power controller;
  determining, based on present output of a sentinel array of solar panels not controlled by the power controller, a range of available solar output production rates, between a time-dependent upper buffer and a non-zero lower buffer, at which the production array of solar panels is likely to deliver the energy at one or more future times; and
  controlling the power controller to cause the production array of solar panels to deliver, to an electric grid to which the power controller is coupled, a particular rate of energy output that is equal to or greater than the rate of energy output sought from the production array of solar panels and that is determined based on the range of available solar output production rates.

16. The non-transitory computer readable storage medium of claim 15, wherein the sentinel array of solar panels is in vicinity of the production array of solar panels and subjected to same environmental conditions as the production array of solar panels, and wherein the particular rate of energy output controlled by the power controller is determined to be within the range of available solar output production rates from the production array of solar panels.

17. The non-transitory computer readable storage medium of claim 15, wherein a delivered rate of energy output is equal to the indication of the rate of energy output or is above the non-zero lower buffer.

18. The non-transitory computer readable storage medium of claim 15, the operations further comprising:
   determining a frequency at which the energy is being provided via the electric grid; and
   generating, using a droop curve and based on the determined frequency, the indication of the rate of energy output sought from the production array of solar panels.

19. The non-transitory computer readable storage medium of claim 15, wherein the determined range of available solar output production rates is based in part on at least one of local climatological patterns, a relative efficiency of local electrical equipment, or a degree to which volatility of supply is to be controlled.

20. The non-transitory computer readable storage medium of claim 15, wherein the indication is:
   received from an automatic generation control system operated by a grid balancing authority, and
   generated by the automatic generation control system based upon a determined frequency or a determined voltage at which the energy is being provided via the electric grid.

* * * * *